(12) United States Patent
Galetti et al.

(10) Patent No.: US 10,281,483 B2
(45) Date of Patent: May 7, 2019

(54) SYSTEM AND METHOD FOR ESTIMATING TURBULENCE BASED ON MULTIPLE WAVELENGTHS

(71) Applicant: THE BOEING COMPANY, Chicago, IL (US)

(72) Inventors: Ralph Galetti, Albuquerque, NM (US); Teresa Neudecker, Albuquerque, NM (US); Richard Holmes, Albuquerque, NM (US); Jeremy Manning, Albuquerque, NM (US); Robert Fetner, III, Albuquerque, NM (US); Angel Portillo, Albuquerque, NM (US)

(73) Assignee: THE BOEING COMPANY, Chicago, IL (US)

( * ) Notice: Subject to any disclaimer, the term of this patent is extended or adjusted under 35 U.S.C. 154(b) by 20 days.

(21) Appl. No.: 15/491,788

(22) Filed: Apr. 19, 2017

(65) Prior Publication Data
US 2018/0259549 A1    Sep. 13, 2018

Related U.S. Application Data

(60) Provisional application No. 62/470,609, filed on Mar. 13, 2017.

(51) Int. Cl.
*G01P 5/26*    (2006.01)
*G06K 9/03*    (2006.01)
(Continued)

(52) U.S. Cl.
CPC .............. *G01P 5/26* (2013.01); *G02B 17/061* (2013.01); *G06K 9/03* (2013.01); *G06K 9/209* (2013.01);
(Continued)

(58) Field of Classification Search
CPC .. G01P 5/26; G02B 5/201; G02B 5/04; G06K 9/0063; G06K 9/209; G06K 9/03;
(Continued)

(56) References Cited

U.S. PATENT DOCUMENTS 5,469,250 A    11/1995 Holmes
8,279,287 B2   10/2012 Belenkii
(Continued)

OTHER PUBLICATIONS

Neimeier, D. et al., "Multiwavelength Differential Image Motion Monitor", Optics Express, Jul. 1, 2001, vol. 10, No. 13, Optical Society of America, 5 pages.
(Continued)

*Primary Examiner* — Tony Ko
(74) *Attorney, Agent, or Firm* — Toler Law Group, P.C.

(57) ABSTRACT

A device includes an image sensor, first optics, second optics, and a processor. The first optics are configured to form a first optical pattern (OP) on the image sensor. The first OP is associated with a first wavelength. The second optics are configured to form a second OP on the image sensor. The second OP is associated with a second wavelength that is longer than the first wavelength. The processor is configured to generate a first turbulence estimate based on relative motion of the first OP, to generate a second turbulence estimate based on relative motion of the second OP, and to generate error correction data. The processor is also configured to adjust the first turbulence estimate based on the error correction data and the second turbulence estimate to determine an estimated turbulence value. The processor may also be configured to estimate a wind profile, a turbulence profile, or both.

20 Claims, 13 Drawing Sheets

(51) Int. Cl.
*G06K 9/20* (2006.01)
*G06T 7/73* (2017.01)
*G06K 9/32* (2006.01)
*G02B 17/06* (2006.01)
*G02B 5/20* (2006.01)

(52) U.S. Cl.
CPC ......... *G06K 9/2018* (2013.01); *G06K 9/3233* (2013.01); *G06T 7/74* (2017.01); *G02B 5/201* (2013.01); *G06T 2207/10032* (2013.01); *G06T 2207/30192* (2013.01)

(58) Field of Classification Search
CPC ............... G06K 9/00335; G06T 7/74; G06T 2207/30192; G06T 2207/10032
See application file for complete search history.

(56) References Cited

U.S. PATENT DOCUMENTS

| | | |
|---|---|---|
| 2005/0151961 A1 | 7/2005 | McGraw et al. |
| 2011/0085698 A1* | 4/2011 | Tillotson ................. G01W 1/00 382/103 |
| 2017/0336499 A1* | 11/2017 | Ito ........................... G01P 5/26 |

OTHER PUBLICATIONS

Stock, J. et al., "In Stars and Stellar Systems", vol. 1, Telescopes, ed. G.P. Kuiper & B.M. Middlehurst, Chicago: University of Chicago Press, 1960, 8 pages.

Fried et al., "Evaluation of r0 for Propagation Down Through the Atmosphere", Appl. Opt., Nov. 1, 1974, vol. 13, No. 11, pp. 2620-2621.

Sarazin et al., "The ESO differential image motion monitor", Astron. Astrophys. 227, Feb. 27, 1990, pp. 294-300.

Tokovinin, A. et al., "From Differential Image Motion to Seeing," Astronomical Society of the Pacific, vol. 114, Oct. 2002, pp. 1156-1166.

Kornilov, V. et al., "Differential image motion in the short-exposure regime," Monthly Notices of the Royal Astronomical Society, vol. 418, 2011, pp. 1878-1888.

Safonov, B.S, "Experimental Examination of Type of Tilt Measured by DIMM," 2011, Institute de Astronomia, UNAM—Astronomical Site Testing Data in Chile, RevMexAA vol. 41, pp. 50-53.

Galetti, R. et al., "Estimating r0 with a Differential Image Motion Monitoring System (DIMMS)", 2015, <https://www.itea.org/conference-proceedings/19th-test-instrumentation-and-directed-energy-te-workshops-proceedings-2015/> retrieved Dec. 22, 2016, 27 pgs.

* cited by examiner ns of the system of FIG. 1;
SYSTEM AND METHOD FOR ESTIMATING TURBULENCE BASED ON MULTIPLE WAVELENGTHS

CROSS-REFERENCE TO RELATED APPLICATIONS

The present application claims the benefit from U.S. Provisional Patent Application No. 62/470,609 entitled "SYSTEM AND METHOD FOR ESTIMATING TURBULENCE BASED ON MULTIPLE WAVELENGTHS," filed Mar. 13, 2017, the contents of which are incorporated herein by reference in their entirety.

FIELD

The present disclosure is generally related to turbulence measurement and estimation.

BACKGROUND

Various applications, such as laser weapon testing and imaging system testing, depend on measurements of turbulence through the atmosphere along a line-of-sight. Turbulence can adversely impact "seeing" conditions. For example, optical beams passing through the atmosphere in the presence of turbulence may appear to blur or move. An erroneous turbulence estimate can impact associated applications. For example, an erroneous turbulence estimate can reduce the accuracy of assessments of performance of imaging systems. As another example, an erroneous turbulence estimate can reduce the accuracy of measurements of performance characteristics (e.g., power measurements) of laser weapons.

SUMMARY

In a particular implementation, a device includes an image sensor, first optics, second optics, and a processor. The first optics are configured to form a first optical pattern on the image sensor. The first optical pattern is associated with a first wavelength. The second optics are configured to form a second optical pattern on the image sensor. The second optical pattern is associated with a second wavelength that is longer than the first wavelength. The processor is coupled to the image sensor. The processor is configured to generate a first turbulence estimate based on relative motion of the first optical pattern. The processor is also configured to generate a second turbulence estimate based on relative motion of the second optical pattern. The processor is further configured to determine error correction data based on a ratio of the first turbulence estimate and the second turbulence estimate. The processor is also configured to adjust the first turbulence estimate based on the error correction data and the second turbulence estimate to determine an estimated turbulence value.

In another particular implementation, a method includes determining, at a device, relative motion of a first optical pattern received at a first image sensor. The first optical pattern is associated with a first wavelength. The method also includes determining, at the device, relative motion of a second optical pattern received at the first image sensor. The second optical pattern is associated with a second wavelength that is longer than the first wavelength. The method further includes generating, at the device, a first turbulence estimate based on the relative motion of the first optical pattern. The method also includes generating, at the device, a second turbulence estimate based on the relative motion of the second optical pattern. The method further includes generating, at the device, error correction data based on a ratio of the first turbulence estimate and the second turbulence estimate. The method also includes adjusting, at the device, the first turbulence estimate based on the error correction data and the second turbulence estimate to determine a first estimated turbulence value.

In another particular implementation, a computer-readable storage device stores instructions that, when executed by a processor, cause the processor to perform operations including determining relative motion of a first optical pattern received at an image sensor. The first optical pattern is associated with a first wavelength. The operations also include determining relative motion of a second optical pattern received at the image sensor. The second optical pattern is associated with a second wavelength that is longer than the first wavelength. The operations further include generating a first turbulence estimate based on the relative motion of the first optical pattern. The operations also include generating a second turbulence estimate based on the relative motion of the second optical pattern. The operations further include determining error correction data based on a ratio of the first turbulence estimate and the second turbulence estimate. The operations also include adjusting the first turbulence estimate based on the error correction data and the second turbulence estimate to determine an estimated turbulence value.

DETAILED DESCRIPTION

Figure 1:
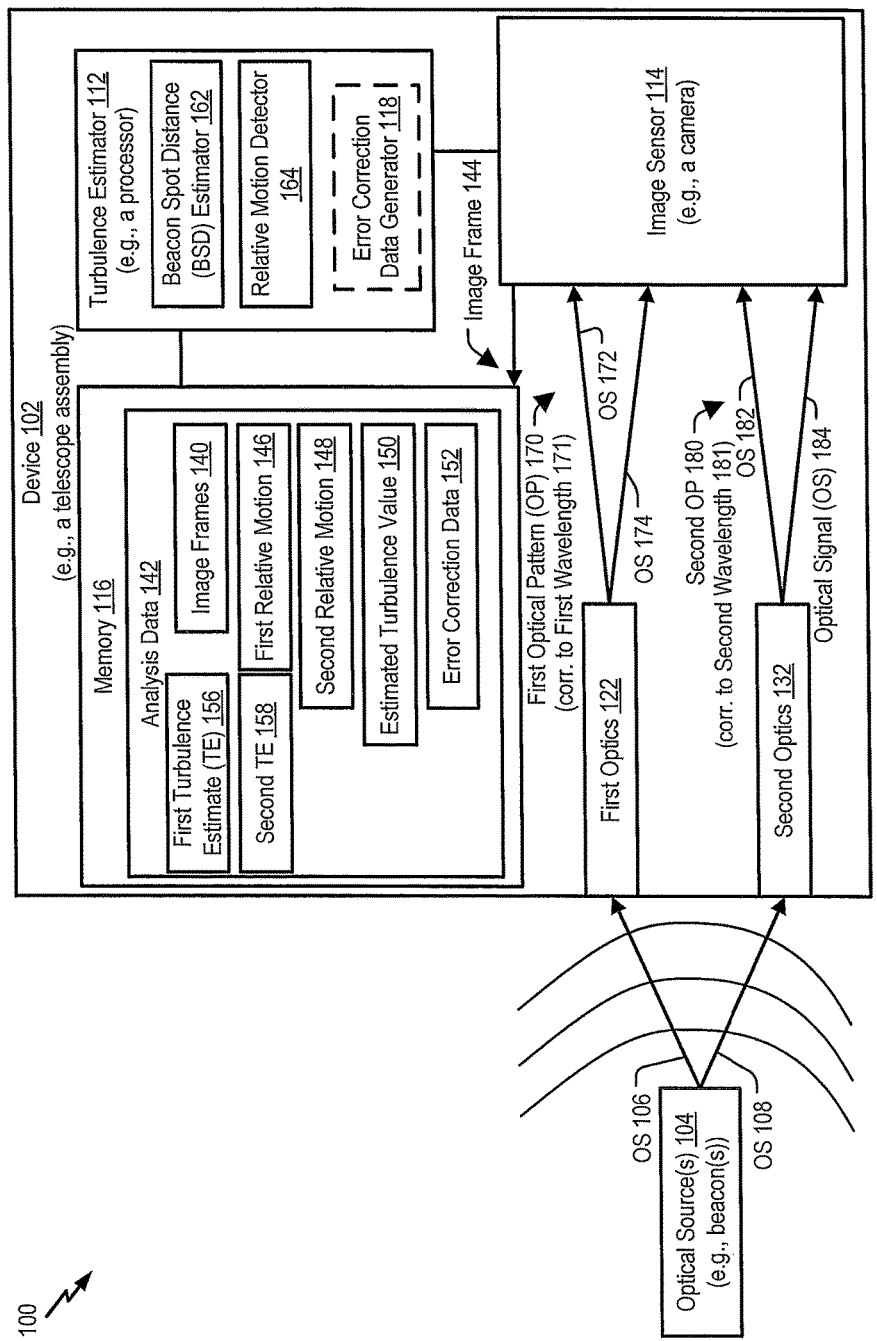
FIG. 1 is a block diagram that illustrates an example of a system configured to estimate turbulence.

Implementations disclosed herein are directed to systems and methods for turbulence estimation based on optical patterns. A system for turbulence estimation may include a device (e.g., a telescope assembly) having a turbulence estimator, optics, and an image sensor (e.g., a camera). Optical signals from an optical source (e.g., a beacon)

passing through first optics may form first images in a focal plane. The first images may correspond to a first wavelength. Although the first images are formed by optical signals from the same optical source, the first images move relative to each other in the presence of turbulence because the optical signals forming the first images travel along different optical paths.

The turbulence estimator may generate a first turbulence estimate based on a measurement of the relative motion over a time period of the first images. To some extent, the effects of turbulence are wavelength-dependent. The first turbulence estimate based on the first images corresponding to the same wavelength may include an error because the first turbulence estimate is representative of the effects of turbulence associated with the first wavelength, but not representative of the effects of turbulence associated with other wavelengths. For example, the first turbulence estimate may be inaccurate in the presence of strong scintillation or significant sky background. The error may be higher during conditions of stronger turbulence.

The device includes second optics. Optical signals passing through the first optics may generate the first images corresponding to the first wavelength. Optical signals passing through the second optics may generate second images corresponding to a second wavelength. For example, the first optics may include first spectral filters configured to pass optical signals having the first wavelength, and the second optics may include second spectral filters configured to pass optical signals having the second wavelength. The turbulence estimator may generate a second turbulence estimate based on relative motion over a time period of the second images.

Turbulence has a greater impact on optical signals corresponding to a shorter wavelength. The first turbulence estimate corresponding to the shorter wavelength may be inaccurate due to absorption, scatter, scintillation, or a combination thereof. The first turbulence estimate, the second turbulence estimate, or both, may include an error when the assumptions are inaccurate. The error may be lower in the second turbulence estimate corresponding to the longer wavelength.

The turbulence estimator may adjust the first turbulence estimate based on error correction data stored in memory and based on the second turbulence estimate. The error correction data may be previously generated based on multiple turbulence estimates corresponding to the first wavelength and the second wavelength. The turbulence estimates may be generated under various conditions. For example, the turbulence estimates may be generated based on testing in various field conditions.

The error correction data may indicate a relationship (e.g., a ratio) between first turbulence estimates associated with the first wavelength and second turbulence estimates associated with the second wavelength. The turbulence estimator may adjust the first turbulence estimate based on the error correction data and the second turbulence estimate to determine an estimated turbulence value. Adjusting the first turbulence estimate based on the error correction data and the second turbulence estimate may reduce (e.g., eliminate) the error in the first turbulence estimate. The estimated turbulence value corresponding to the adjusted first turbulence estimate may thus be a more accurate estimate of the turbulence.

FIG. 1 illustrates an example of a system 100 for estimating turbulence. The system 100 includes a device 102 (e.g., a telescope assembly) and one or more optical sources 104 (e.g., light source(s), such as beacons or lasers). The device 102 is configured to estimate turbulence in an optical medium (e.g., air) along a path between the optical source(s) 104 and a component (e.g., an image sensor 114) of the device 102, as described herein. Although a single image sensor (e.g., the image sensor 114) is illustrated in FIG. 1, it should be understood that in some implementations the device 102 includes multiple image sensors.

The device 102 includes optics configured to receive optical signals from the optical sources and to form optical patterns on the image sensor 114 (e.g., a camera). For example, in FIG. 1, the device 102 includes first optics 122 and second optics 132. In other examples, the device 102 includes more than two sets of optics. The first optics 122 are configured to receive an optical signal (OS) 106 from the optical source(s) 104 and to form a first optical pattern (OP) 170 to the image sensor 114, as described herein. In a particular aspect, an optical pattern may correspond to a pair of optical spots, as further described with reference to FIG. 4. As described herein, an "optical spot" may also be referred to as a "beacon spot." The first OP 170 is associated with a first wavelength 171. The second optics 132 are configured to receive an OS 108 from the optical source(s) 104 and to form a second OP 180 on the image sensor 114. The second OP 180 is associated with a second wavelength 181. The second wavelength 181 is distinct from the first wavelength 171. The OS 106 may be the same as or distinct from the OS 108. In a particular aspect, the OS 106 is received from the same optical source as the OS 108. In an alternate aspect, the OS 106 is received from a first optical source (e.g., a light source) of the optical source(s) 104, the OS 108 is received from a second optical source (e.g., a light source) of the optical source(s) 104, and the second optical source is distinct from the first optical source.

The image sensor 114 is configured to generate image frames 140 that include images formed by optical patterns received from the optics, as described herein. The memory 116 is configured to store analysis data 142 that may be used, generated, or both, by the turbulence estimator 112. For example, the analysis data 142 may include one or more of the image frames 140.

The turbulence estimator 112 includes a beacon spot distance (BSD) estimator 162 and a relative motion detector 164. In some implementations, the turbulence estimator 112 also includes an error correction data generator 118. The error correction data generator 118 is configured to generate error correction data 152. In a particular aspect, the error correction data generator 118 of the device 102 generates the error correction data 152, as described herein. In an alternate aspect, the device 102 receives the error correction data 152 from another device. The error correction data 152 is stored in the memory 116.

The BSD estimator 162 is configured to determine a first plurality of BSD measurements corresponding to the first OP 170, as described with reference to FIGS. 4-5. Each of the first plurality of BSD measurements may indicate a distance, at a particular time, between beacon spots formed by the first OP 170, as described with reference to FIGS. 4-5. The BSD estimator 162 is also configured to generate a second plurality of BSD measurements corresponding to the second OP 180. Each of the second plurality of BSD measurements may indicate a distance, at a particular time, between beacon spots formed by the second OP 180, as described with reference to FIGS. 4-5. The relative motion detector 164 is configured to determine first relative motion 146 of the first OP 170 during a time period based on the first plurality of BSD measurements and a second relative motion 148 of the second OP 180 during the time period based on the second plurality of BSD measurements, as described with reference to FIG. 5.

The turbulence estimator 112 is configured to determine a first turbulence estimate (TE) 156 based on the first relative motion 146 and a second TE 158 based on the second relative motion 148, as described herein. The first TE 156 is associated with the first wavelength 171, and the second TE 158 is associated with the second wavelength 181. Each of the first TE 156 and the second TE 158 may estimate turbulence in an optical medium (e.g., air) between the optical source(s) 104 and the device 102. Turbulence may have more impact on the first wavelength 171 (e.g., shorter wavelength). The first TE 156 may thus be a more accurate representation of the turbulence as compared to the second TE 158. However, since turbulence has more impact on the first wavelength 171, the first TE 156 may have greater errors than the second TE 158. The second TE 158 may be used to fine-tune the first TE 156. For example, the first TE 156 may be adjusted based at least in part on the second TB 158 to reduce (e.g., eliminate) the errors, as described herein.

The error correction data 152 may indicate a relationship between first turbulence estimates associated with the first wavelength 171 and second turbulence estimates associated with the second wavelength 181. The turbulence estimator 112 is configured to adjust the first TE 156 based on the second TE 158 and the error correction data 152 to generate an estimated turbulence value 150. Adjusting the first TE 156 may reduce (e.g., eliminate) the error. The estimated turbulence value 150 corresponding to the adjusted first TE 156 may thus be a more accurate estimation of turbulence as compared to the first TE 156 (prior to adjustment) and the second TE 158.

During operation, one or more sets of optics of the device 102 receive one or more optical signals from one or more of the optical source(s) 104. For example, the first optics 122 receive the OS 106 from the optical source(s) 104, and the second optics 132 receive the OS 108 from the optical source(s) 104. The OS 106 may be transmitted by a first optical source of the optical source(s) 104. The OS 108 may be transmitted by a second optical source of the optical source(s) 104. In a particular implementation, the first optical source is the same as the second optical source. In an alternative implementation, the first optical source is distinct from the second optical source. The OS 106 may have a first wavelength that is the same as or distinct from a second wavelength of the OS 108.

The first optics 122 generate the first OP 170 based on the OS 106. For example, the first optics 122 generate the first OP 170 by transmitting (e.g., passing) a first plurality of optical signals, as further described with reference to FIGS. 2-3. The first plurality of optical signals includes an OS 172 and an OS 174. In some implementations, the first plurality of optical signals includes more than two optical signals. Each of the first plurality of optical signals (e.g., the OS 172 and the OS 174) has the first wavelength 171.

Similarly, the second optics 132 generate the second OP 180 based on the OS 108. For example, the second optics 132 generate the second OP 180 by transmitting (e.g., passing) a second plurality of optical signals, as further described with reference to FIGS. 2-3. The second plurality of optical signals includes an OS 182 and an OS 184. In some implementations, the second plurality of optical signals includes more than two optical signals. Each of the second plurality of optical signals (e.g., OS 182 and the OS 184) has the second wavelength 181.

The image sensor 114 captures, at a first time, an image frame 144 including images formed by optical patterns received from the optics of the device 102. For example, the image frame 144 includes a first image formed by the first OP 170. A first Portion of the first OP 170 in the image frame 144 is formed by the OS 172, and a second portion of the first OP 170 in the image frame 144 is formed by the OS 174.

The image frame 144 also includes a second image formed by the second OP 180. For example, a first portion of the second OP 180 in the image frame 144 is formed by the OS 182, and a second portion of the second OP 180 in the image frame 144 is formed by the OS 184. The image frame 144 may have a timestamp indicative of the first time. The image sensor 114 may provide the image frame 144 to the memory 116. The image frame 144 may be stored in the memory 116 as part of the analysis data 142. It should be understood that a single image frame (e.g., the image frame 144) including images corresponding to multiple OPs is described for ease of illustration. In alternative implementations, the image sensor 114 may generate multiple image frames capturing images at the same time of various portions of the first OP 170, the second OP 180, or both.

The BSD estimator 162 is configured to determine a first BSD measurement and a second BSD measurement based on the image frame 144, as further described with reference to FIGS. 4-5. The first BSD measurement indicates a first distance between the first portion of the first OP 170 and the second portion of the first OP 170 in the image frame 144. The first BSD measurement corresponds to the first wavelength 171 associated with the first OP 170. The second BSD measurement indicates a second distance between the first portion of the second OP 180 and the second portion of the second OP 180 in the image frame 144. The second BSD measurement corresponds to the second wavelength 181 associated with the second OP 180. The BSD estimator 162 may store the first BSD measurement and the second BSD measurement in the memory 116. Each of the first BSD measurement and the second BSD measurement is associated with the first timestamp of the image frame 144. For example, each of the first BSD measurement and the second BSD measurement may be stored in the memory 116 with a reference to the first timestamp, the image frame 144, or both.

The relative motion detector 164 is configured to determine a first relative motion 146 over a time period associated with the first wavelength 171, as further described with reference to FIG. 5. For example, the relative motion detector 164 is configured to determine the first relative motion 146 based on a variance between the first BSD measurement and at least one additional BSD measurement associated with the first wavelength 171. To illustrate, a third BSD measurement may be stored in the memory 116. The third BSD measurement may indicate a third distance between the first portion of the first OP 170 and the second portion of the first OP 170 in a second image frame of the image frames 140. The third BSD measurement may be associated with the first wavelength 171 and a second timestamp of the second image frame. The relative motion detector 164 may determine the first relative motion 146 based at least in part on a variance between the first BSD measurement and the third BSD measurement. In a particular aspect, the variance may be measured in terms of a number of camera pixels. For example, the first BSD measurement may correspond to a first number of camera pixels and the third BSD measurement may correspond to a second number of camera pixels.

Similarly, the relative motion detector 164 is configured to determine a second relative motion 148 associated with the second wavelength 181, as further described with reference to FIG. 5. For example, the relative motion detector 164 is configured to determine the second relative motion 148 based on a variance between the second BSD measurement and at least one additional BSD measurement associated with the second wavelength 181.

The turbulence estimator 112 is configured to determine the first TE 156 based on the first relative motion 146 and the first wavelength 171. The turbulence estimator 112 is configured to determine the second TE 158 based on the second relative motion 148 and the second wavelength 181. For example, the turbulence estimator 112 is configured to determine each of the first TE 156 and the second TE 158 based on the following Equation:

$$r0 = \left(\frac{\sigma^2 q^2}{K\lambda^2 d^{-1}/3}\right) \quad \text{Equation 1}$$

In a first example, r0 corresponds to the first TE 156, $\sigma^2$ corresponds to the first relative motion 146 (e.g., variance of BSD measurements over time, measured in camera pixels), d corresponds to a diameter of a subaperture of the first optics 122, $\lambda$ corresponds to the first wavelength 171, q corresponds to an instantaneous field of view (IFOV) of a pixel of the image frame 144, and K corresponds to a tilt constant. The first optics 122 includes a plurality of subapertures, as further described with reference to FIGS. 2-3. A subaperture includes an iris, as further described with reference to FIG. 3. The diameter of a subaperture of the first optics 122 may correspond to a diameter of an iris of the subaperture. The IFOV of the pixel may correspond to a measure of a spatial resolution of the image sensor 114.

In a second example, r0 corresponds to the second TE 158, $\sigma^2$ corresponds to the second relative motion 148 (e.g., variance of BSD measurements over time, measured in camera pixels), d corresponds to a diameter of a subaperture of the second optics 132, $\lambda$ corresponds to the second wavelength 181, q corresponds to the IFOV of a pixel of the image frame 144, and K corresponds to the tilt constant. The diameter of a subaperture of the second optics 132 may correspond to a diameter of an iris of the subaperture of the second optics 132.

The tilt constant (K) may be based on a direction of image motion, a ratio of aperture separation (B) to aperture diameter (d), a type of tilt, or a combination thereof. The direction of image motion may include longitudinal (e.g., parallel to aperture separation) motion, transverse (e.g., perpendicular to aperture separation) motion, or both. Longitudinal motion is parallel to an x-axis (e.g., an aperture separation vector). Transverse motion is perpendicular to the x-axis (e.g., the aperture separation vector). The x-axis is placed along a line connecting centers of apertures. The type of tilt may include G-tilt (gradient tilt or centroid tilt), Z-tilt (Zernike tilt), or another type of tilt. The tilt constant (K) corresponding to the G-tilt for longitudinal motion may be based on the following Equation:

$$K_{lG}=0.34(1-0.57b^{-1/3}-0.04b^{-7/3}) \quad \text{Equation 2}$$

In Equations 2-5, b corresponds to a ratio of aperture separation (B) and aperture diameter (d) (e.g., b=B/d). The tilt constant (K) corresponding to the G-tilt for transverse motion is based on the following Equation:

$$K_{tG}=0.34(1-0.855b^{-1/3}-0.03b^{-7/3}) \quad \text{Equation 3}$$

The tilt constant (K) corresponding to the Z-tilt for longitudinal motion is based on the following Equation:

$$K_{lZ}=0.364(1-0.532b^{-1/3}-0.024b^{-7/3}) \quad \text{Equation 4}$$

The tilt constant (K) corresponding to the Z-tilt for transverse motion is based on the following Equation:

$$K_{tZ}=0.364(1-0.798b^{-1/3}-0.018b^{-7/3}) \quad \text{Equation 5}$$

In a first example, the aperture separation (B) corresponds to a distance between the subapertures of the first optics 122, the aperture diameter (d) corresponds to a diameter of an iris of a subaperture of the first optics 122, a line connecting centers of the subapertures of the first optics 122 may correspond to an x-axis, motion parallel to the x-axis may correspond to longitudinal motion, and motion perpendicular to the x-axis may correspond to transverse motion. In a second example, the aperture separation (B) corresponds to a distance between the subapertures of the second optics 132, the aperture diameter (d) corresponds to a diameter of an iris of a subaperture of the second optics 132, a line connecting centers of the subapertures of the second optics 132 may correspond to an x-axis, motion parallel to the x-axis may correspond to longitudinal motion, and motion perpendicular to the x-axis may correspond to transverse motion.

The turbulence estimator 112 may store the first TE 156 and the second TE 158 in the memory 116. The first wavelength 171 may be shorter than the second wavelength 181. The first TE 156 corresponding to a shorter wavelength may underestimate turbulence in the optical medium between the optical source(s) 104 and the device 102. The second TE 158 corresponding to a longer wavelength may be a more accurate representation of the turbulence as compared to the first TE 156. However, under certain conditions, the second TE 158 may include an error. For example, calculations (e.g., Equation 1) used to determine the second TE 158 may be based on certain assumptions, such as an absence of dispersion, scintillation, or both. The second TE 158 may also include an error when the assumptions are inaccurate.

The turbulence estimator 112 may adjust the first TE 156 based on the second TE 158 and the error correction data 152 to generate the estimated turbulence value 150. For example, the error correction data 152 may indicate a relationship between first turbulence estimates corresponding to the first wavelength 171 and second turbulence estimates corresponding to the second wavelength 181. The turbulence estimator 112 may determine that the error correction data 152 indicates that a range of turbulence estimates associated with the first wavelength 171 correspond to the second TE 158 associated with the second wavelength 181. In a particular aspect, the turbulence estimator 112 may determine that the first TE 156 and the second TE 158 are based on image frames (e.g., the image frame 144) that were captured during particular conditions. The particular conditions may correspond to a day, a time of day, a weather condition, an altitude, a location, a level of dispersion, a level of scintillation, a level of turbulence, or a combination thereof. The turbulence estimator 112 may determine that the error correction data 152 indicates that, under the particular conditions, a range of turbulence estimates associated with the first wavelength 171 correspond to the second TE 158 associated with the second wavelength 181, as further described with reference to FIG. 6.

The range of turbulence estimates includes values from a first value (e.g., a lower value) to a second value (e.g., a higher value). The turbulence estimator 112 may, in response to determining that the first TE 156 is outside the range of turbulence estimates, generate the estimated turbulence value 150 to have a particular value. For example, the turbulence estimator 112 may, in response to determining that the first TE 156 is less than the first value (e.g., the lower value), generate the estimated turbulence value 150 to equal the first value. In another example, the turbulence estimator 112 may, in response to determining that the first TE 156 is less than the first value, generate the estimated turbulence value 150 by adjusting the first TB 156 closer to the first value. To illustrate, the turbulence estimator 112 may, in response to determining that the first TE 156 is less than the first value, generate the estimated turbulence value 150 to equal a sum of the first TE 156 and a first adjustment value (e.g., estimated turbulence value 150=first TE 156+first adjustment value). The first adjustment value may correspond to a configuration setting, a user input, or both.

Alternatively, the turbulence estimator 112 may, in response to determining that the first TE 156 is greater than the second value (e.g., the higher value), generate the estimated turbulence value 150 to equal the second value. In another aspect, the turbulence estimator 112 may, in response to determining that the first TE 156 is greater than the second value, generate the estimated turbulence value 150 to by adjusting the first TE 156 closer to the second value. For example, the turbulence estimator 112 may, in response to determining that the first TE 156 is greater than the second value, generate the estimated turbulence value 150 to equal a difference between the first TE 156 and a second adjustment value (e.g., estimated turbulence value 150=first TE 156−second adjustment value). The second adjustment value may correspond to a configuration setting, a user input, or both. The estimated turbulence value 150 (corresponding to the adjusted first TE 156) may be a more accurate estimate of turbulence as compared to the first TB 156 (prior to adjustment) and the second TE 158. The turbulence estimator 112 may store the estimated turbulence value 150 in the memory 116. The estimated turbulence value 150 may indicate an estimated turbulence associated with a path (e.g., an optical line-of-sight path) between the image sensor 114 and the optical source(s) 104.

In a particular aspect, the error correction data generator 118 may update the error correction data 152 based on the first TE 156 and the second TE 158. For example, the error correction data generator 118 may update the error correction data 152 based on a plurality of first TEs and a plurality of second TEs, as described with reference to FIG. 6. The plurality of first TEs may include the first TE 156 and the plurality of second TEs may include the second TE 158.

The estimated turbulence value 150 may be used by various applications or systems associated with or coupled to the device 102. For example, a weapons system may adjust measurement of laser power on a target based on the estimated turbulence value 150. As a more accurate estimate of turbulence, the estimated turbulence value 150 may increase accuracy of the measurements of the weapons system performance. The device 102 (e.g., the turbulence estimator 112 or another component) may update settings of a laser weapon based on the estimated turbulence value 150. For example, the device 102 may, in response to determining that the estimated turbulence value 150 satisfies (e.g., is greater than) a first threshold, set (e.g. increase) a power setting of a laser weapon to a first power, set (e.g., increase) an irradiance duration setting of the laser weapon to a first irradiance duration, or both. As another example, the device 102 may, in response to determining that the estimated turbulence value 150 satisfies (e.g., is less than or equal to) a second threshold, set (e.g. decrease) a power setting of a laser weapon to a second power, set (e.g., decrease) an irradiance duration setting of the laser weapon to a second irradiance duration, or both. In some implementations, one or more components of the device 102 are integrated into an aircraft and the optical source(s) 104 are located at or proximate to a landing location associated with the aircraft. As a more accurate estimate of turbulence, the estimated turbulence value 150 may increase accuracy of measurements of a navigation system of the aircraft.

In a particular aspect, determination of r0 at two or more wavelengths has the can improve turbulence estimates for horizontal-path propagation (or near-horizontal-path propagation) where estimates using a single wavelength (e.g., the first wavelength) can generate large errors in the turbulence estimate. For example, some systems that use a single wavelength may address uplooking geometry, not horizontal-path geometry. The uplooking geometry may not generate large turbulence estimate errors because the integrated turbulence strength is typically smaller for such uplooking geometries. Thus, such systems are not well suited to address the issues associated with strong-turbulence and long-path horizontal geometries. Embodiments disclosed herein address are better suited to generate turbulence estimates in the presence of strong turbulence in long-path horizontal geometries. For example, a second wavelength (e.g., a longer wavelength) may be used in conjunction with a first wavelength to generate a turbulence estimate. The second (e.g., longer) wavelength may be associated with less severe error sources, such as scintillation. The second wavelength can therefore provide a lower-error estimate of the turbulence in cases in which the turbulence is strong. The second wavelength also can reduce the error in the estimate by combining it with the first error estimate in a statistically beneficial way, according to the estimates of the variance of the two measurements at the two wavelengths. This approach can also be extended to more than two wavelengths (of course).

Furthermore, determining the turbulence estimates using multiple wavelengths can provide a better estimate of the turbulence strength. For example, as explained above, one or more additional turbulence estimates can be computed from measurements at longer wavelengths where the error sources such as scintillation and dispersion are reduced. These multiple turbulence estimates can be combined in a statistically beneficial way, based on the turbulence estimates and estimates of their error are determined. For example, an improved error estimate (T3) can be determined based on:

$$T3=(T1\sigma_{T2}^2+T2\sigma_{T1}^2)/(\sigma_{T2}^2+\sigma_{T1}^2)$$

where T1 is a particular turbulence estimate at a first wavelength, and σT1 is an error estimate (e.g., standard deviation) associated with T1 based on a set of measurements at the first wavelength gathered sequentially, T2 is a particular turbulence estimate at a second wavelength, and $\sigma_{T2}$ is an error estimate (e.g., standard deviation) associated with T2 based on a set of measurements at the second wavelength gathered sequentially.

As another example, in some circumstances, the turbulence estimate at the first wavelength is systematically smaller or larger than the true turbulence due to errors such as scintillation. To address, a wavelength-scaled ratio e(r0) of the turbulence estimates may be used to characterize this systematic error, which is approximately a constant for a given path geometry and a range of turbulence strengths. In this case, the wavelength-scaled ratio e(r0) can determined from prior measurements, prior wave-optics simulations, or prior analytical calculations for that path geometry and range of turbulence strengths. The wavelength-scaled ratio e(r0) can be used in conjunction with the second turbulence estimate at a second wavelength to form a better first turbulence estimate by taking the product of the known prior wavelength-scaled ratio and the second turbulence estimate.

Figure 2:
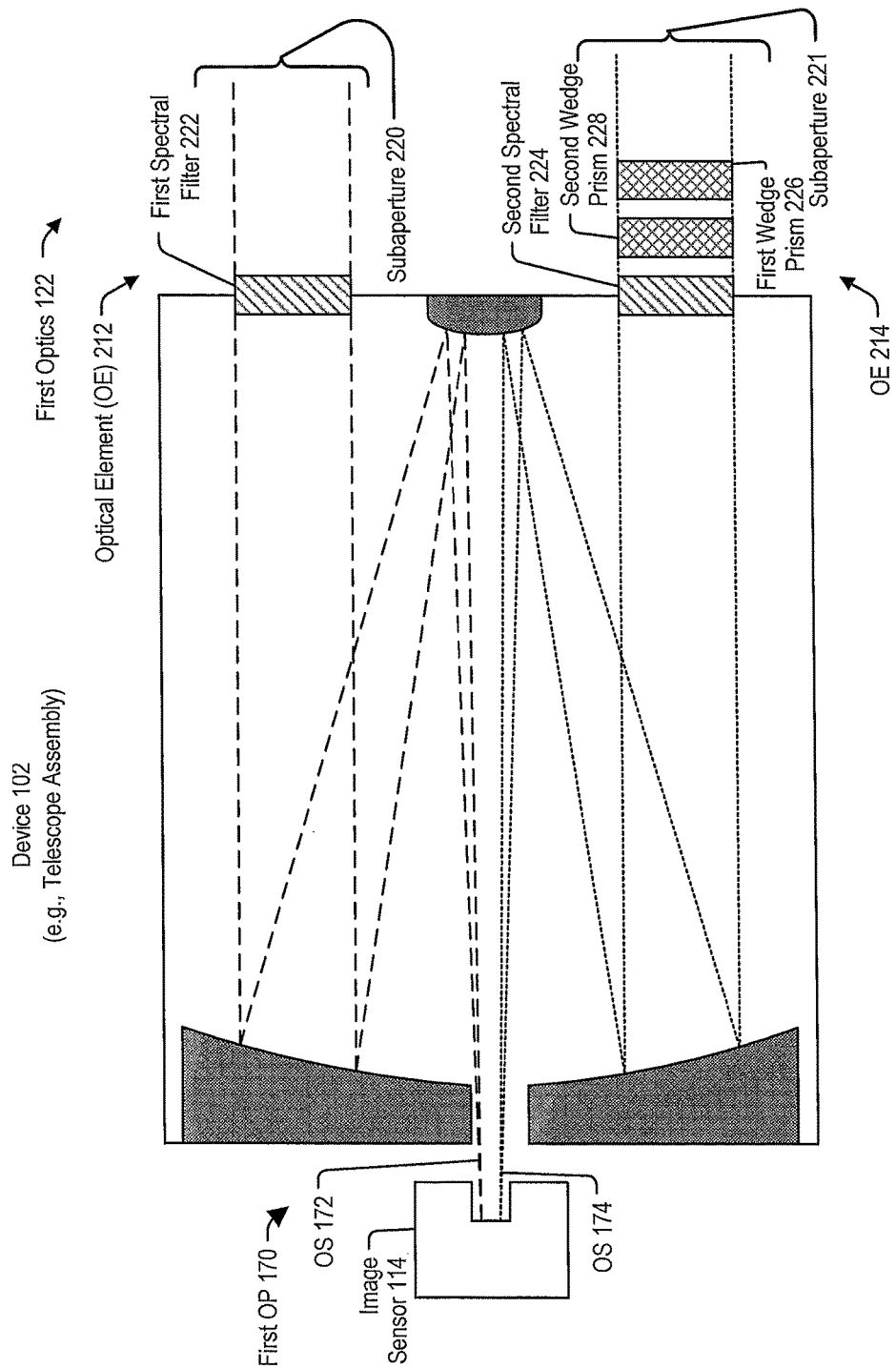
FIG. 2 is a diagram that illustrates examples of components of the system of FIG. 1.

FIG. 2 illustrates examples of components of the device 102. The device 102 (e.g., a telescope assembly) includes the first optics 122 and the image sensor 114. The first optics 122 include an optical element (OE) 212 and an OE 214. In some aspects, the first optics 122 include more than two OEs. The OE 212 includes a first spectral filter 222 aligned with a subaperture 220. The OE 214 includes a second spectral filter 224 aligned with a subaperture 221. Each of the first spectral filter 222 and the second spectral filter 224 is configured to pass an optical signal having the first wavelength 171 of FIG. 1. For example, the first spectral filter 222 (and the second spectral filter 224) may be configured to filter (e.g., reflect) optical signals corresponding to wavelengths other than the first wavelength 171.

The OE 214 may include one or more wedge prisms aligned with the second spectral filter 224. For example, the OE 214 includes a first wedge prism 226 and a second wedge prism 228. Each of the first wedge prism 226 and the second wedge prism 228 is aligned with the second spectral filter 224. The first wedge prism 226 may be configured to modify a direction of optical signals passing through the first wedge prism 226. The second wedge prism 228 may be configured to modify a direction of optical signals passing through the second wedge prism 228. The device 102 may include one or more reflective surfaces.

During operation, an optical signal from the optical source(s) 104 of FIG. 1 may pass through the first spectral filter 222 to generate the OS 172 having the first wavelength 171. An optical signal from the optical source(s) 104 may pass through the first wedge prism 226, the second wedge prism 228, and the second spectral filter 224 to generate the OS 174 having the first wavelength 171. The OS 172 may form a first portion of the first OP 170. The OS 174 may form a second portion of the first OP 170. The first wedge prism 226 and the second wedge prism 228 may modify a direction of the optical signal passing through the first wedge prism 226 and the second wedge prism 228 so that the OS 174 forms the second portion of the first OP 170 at a distance from the first portion of the first OP 170 formed by the OS 172.

The image sensor 114 may capture the image frame 144 at a first time. The image frame 144 may include an image of the first OP 170. For example, the image frame 144 may include the first portion of the first OP 170 formed by the OS 172 and the second portion of the first OP 170 formed by the OS 174.

It should be understood that the second optics 132 may have one or more components that are similar to the first optics 122. The second optics 132 differ from the first optics 122 in that one or more spectral filters of the second optics 132 are configured to pass an optical signal having the second wavelength 181 of FIG. 1.

Although the device 102 is illustrated in FIG. 2 as including a single set of optics (e.g., the first optics 122), it should be understood that the device 102 may include multiple sets of optics. For example, the device 102 may include a first set of optics (e.g., the first optics 122) associated with the first wavelength 171, a second set of optics (e.g., the second optics 132) associated with the second wavelength 181 of FIG. 1, a third set of optics associated with the first wavelength 171, the second wavelength 181, or another wavelength, one or more additional sets of optics, or a combination thereof.

Figure 3:
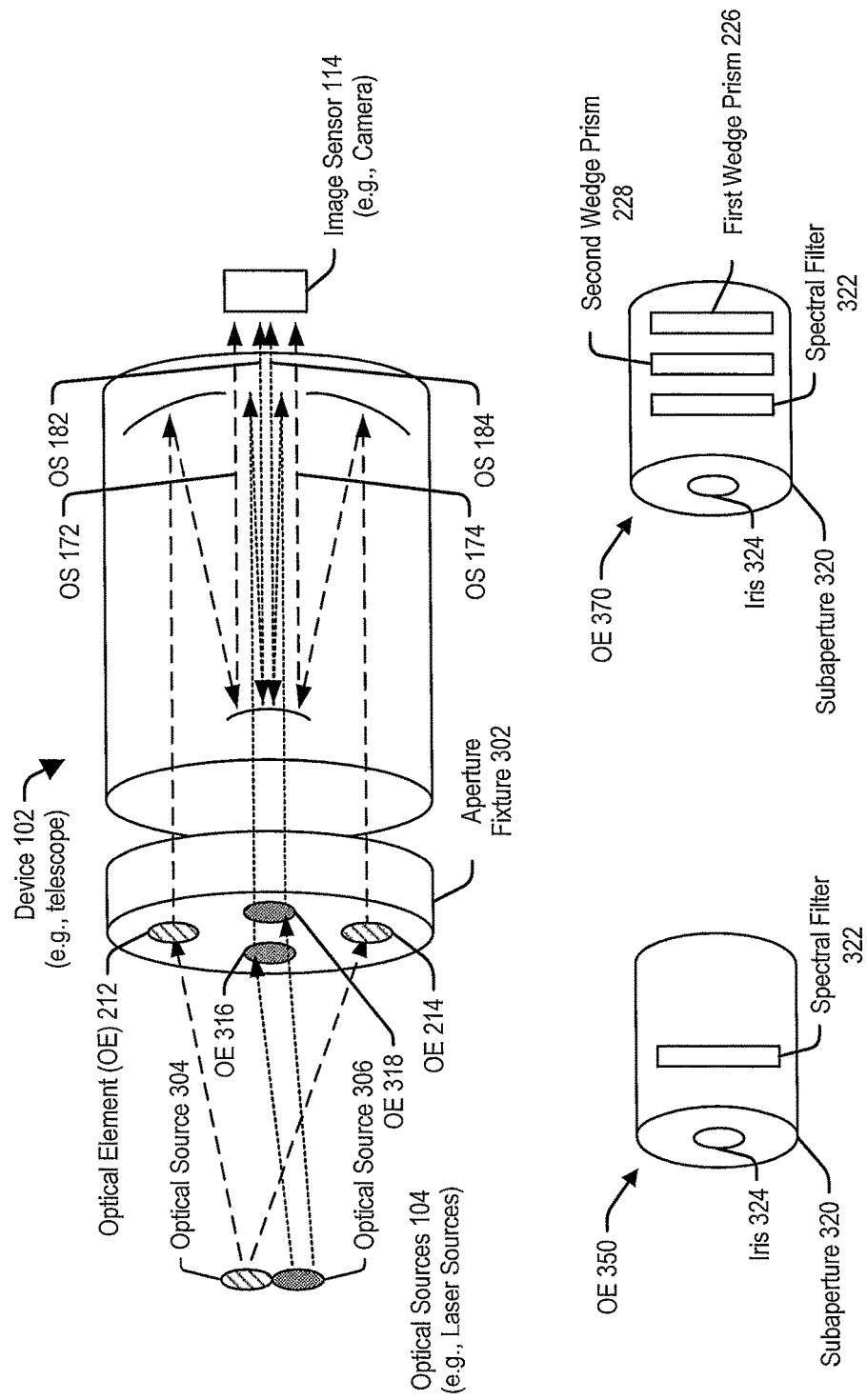
FIG. 3 is a diagram that illustrates examples of components of the system of FIG. 1.

FIG. 3 illustrates examples of components of the device 102. The device 102 (e.g., a telescope) includes an aperture fixture 302 and the image sensor 114 (e.g., a camera). The aperture fixture 302 includes a plurality of OEs. For example, the aperture fixture 302 includes the OE 212 and the OE 214 corresponding to the first optics 122 of FIG. 1. The aperture fixture 302 includes an OE 316 and an OE 318 corresponding to the second optics 132 of FIG. 1. Although four OEs are illustrated in FIG. 3, it should be understood that the aperture fixture 302 may include more than four OEs.

FIG. 3 also illustrates an OE 350 and an OE 370. The OE 350 may correspond to an example of an implementation of the OE 212, the OE 214, the OE 316, the OE 318, or a combination thereof. The OE 370 may correspond to an example of an implementation of the OE 212, the OE 214, the OE 316, the OE 318, or a combination thereof. In a particular aspect, the OE 212 of the first optics 122 corresponds to a first copy of the OE 350, and the OE 214 of the first optics 122 corresponds to a first copy of the OE 370. In a particular aspect, the OE 316 of the second optics 132 corresponds to a second copy of the OE 350, and the OE 318 of the second optics 132 corresponds to a second copy of the OE 370.

The OE 350 includes a subaperture 320 and a spectral filter 322. The subaperture 320 has an iris 324. A diameter of the iris 324 may be adjustable. For example, the device 102 may be configured to adjust the diameter of the iris 324 based on a configuration setting or user input. The spectral filter 322 may be configured to pass an optical signal having a particular wavelength. In a particular aspect, the particular wavelength may correspond to the first wavelength 171, the second wavelength 181 of FIG. 1, or another wavelength.

The OE 370 includes the first wedge prism 226 and the second wedge prism 228 in addition to the subaperture 320 and the spectral filter 322. In a particular aspect, the OE 350 corresponds to the OE 212, the subaperture 320 of the OE 350 corresponds to the subaperture 220 of FIG. 2, and the spectral filter 322 of the OE 350 corresponds to the first spectral filter 222 of FIG. 2. In a particular aspect, the OE 370 corresponds to the OE 214, the subaperture 320 of the OE 370 corresponds to the subaperture 221 of FIG. 2, and the spectral filter 322 of the OE 370 corresponds to the second spectral filter 224 of FIG. 2.

During operation, the OE 212 and the OE 214 may receive optical signals from an optical source 304 of the optical sources 104. The OE 316 and the OE 318 may receive optical signals from an optical source 306 of the optical sources 104. In a particular aspect, the optical source 304 may transmit optical signals having the same wavelength as the optical signals transmitted by the optical source 306. Each of the OE 212 and the OE 214 may include a spectral filter (e.g., the spectral filter 322) configured to pass optical signals having the first wavelength 171 of FIG. 1. Each of the OE 316 and the OE 318 may include a spectral filter (e.g., the spectral filter 322) configured to pass optical signals having the second wavelength 181.

The OE 212 and the OE 214 may form the first OP 170 of FIG. 1 on the image sensor 114. For example, the OE 212 may form a first portion of the first OP 170 on the image sensor 114 by transmitting (e.g., passing) the OS 172. The OE 214 may form a second portion of the first OP 170 on the image sensor 114 by transmitting (e.g., passing) the OS 174.

The OE 316 and the OE 318 may form the second OP 180 of FIG. 1 on the image sensor 114. For example, the OE 316 may form a first portion of the second OP 180 on the image sensor 114 by transmitting (e.g., passing) the OS 182 to the image sensor 114. The OE 318 may form a second portion of the second OP 180 on the image sensor 114 by transmitting (e.g., passing) the OS 184 to the image sensor 114.

The image sensor 114 may capture the image frame 144 of FIG. 1 at a first time. The image frame 144 may include a first image of the first OP 170 and a second image of the second OP 180. For example, the image frame 144 may include the first portion of the first OP 170 formed by the OS 172 and the second portion of the first OP 170 formed by the OS 174. The image frame 144 may include the first portion of the second OP 180 formed by the OS 182 and the second portion of the second OP 180 formed by the OS 184.

Figure 4:
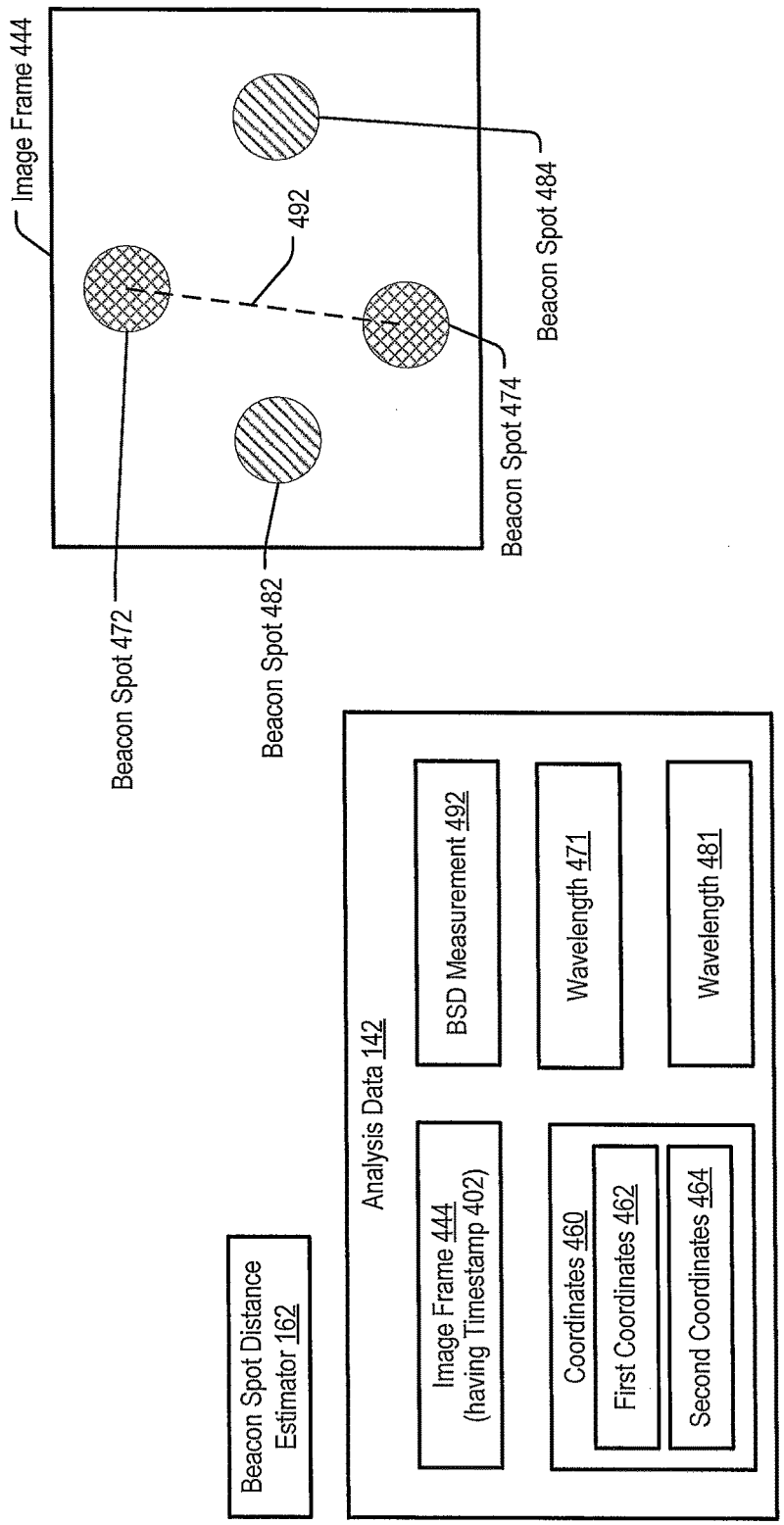
FIG. 4 is a diagram that illustrates an example of a beacon spot distance measurer of the system of FIG. 1.

FIG. 4 illustrates an example of the BSD estimator 162. The BSD estimator 162 is configured to generate a BSD measurement 492 corresponding to a wavelength 471 based on an image frame 444, as described herein. The image frame 444 may correspond to the image frame 144 of FIG. 1 or a second image frame of the image frames 140 of FIG. 1. The image frame 444 may be stored in the memory 116 of FIG. 1. For example, the analysis data 142 may include the image frame 444.

The image frame 444 has a timestamp 402. The timestamp 402 is indicative of a time at which the image sensor 114 of FIG. 1 generated the image frame 444. The image frame 444 includes a beacon spot 472, a beacon spot 474, a beacon spot 482, and a beacon spot 484. Each of the beacon spots 472, 474, 482, and 484 may be formed by an optical signal transmitted (e.g., passed) by optics of the device 102 of FIG. 1. For example, the OS 172 of FIG. 1 may form the beacon spot 472. The OS 174 of FIG. 1 may form the beacon spot 474. The OS 182 of FIG. 1 may form the beacon spot 482. The OS 184 of FIG. 1 may form the beacon spot 484. In particular implementations, the image frame 444 may include more than four beacon spots. It should be understood that although the beacon spots 472, 474, 482, and 484 are illustrated as circular in FIG. 4, one or more of the beacon spots 472, 474, 482, or 484 may have other regular or irregular shapes (or patterns).

The image frame 444 may include one or more images of optical patterns. For example, a first image of the first OP 170 may include the beacon spots 472 and 474. A second image of the second OP 180 may include the beacon spots 482 and 484. In this example, the beacon spot 472 corresponds to a first portion of the first OP 170, and the beacon spot 474 corresponds to a second portion of the first OP 170. The beacon spot 482 corresponds to a first portion of the second OP 180, and the beacon spot 484 corresponds to a second portion of the second OP 180.

In an alternative implementation, the OS 172 forms the beacon spot 482, the OS 174 forms the beacon spot 484, the OS 182 forms the beacon spot 472, and the OS 184 forms the beacon spot 474. In this implementation, a first image of the first OP 170 includes the beacon spots 482-484 and a second image of the second OP 180 includes the beacon spots 482-484. The beacon spot 482 corresponds to a first portion of the first OP 170, and the beacon spot 484 corresponds to a second portion of the first OP 170. The beacon spot 472 corresponds to a first portion of the second OP 180, and the beacon spot 474 corresponds to a second portion of the second OP 180.

During operation, the BSD estimator 162 may identify beacon spots in the image frame 444 corresponding to particular wavelengths, as described herein. The BSD estimator 162 may determine a pixel value associated with each pixel of the image frame 444. A particular range of pixel values may be associated with the wavelength 471. In a particular aspect, the wavelength 471 may correspond to the first wavelength 171 or the second wavelength 181 of FIG. 1. The BSD estimator 162 may determine that a particular pixel of the image frame 444 corresponds to the wavelength 471 in response to determining that a pixel value of the particular pixel is within the particular range of pixel values.

The BSD estimator 162 may identify the beacon spots 472-474 in the image frame 444 corresponding to the wavelength 471. For example, the BSD estimator 162 may identify a first group of pixels of the image frame 444 as the beacon spot 472 in response to determining that each pixel of the first group of pixels satisfies a membership criterion corresponding to the wavelength 471. For example, the BSD estimator 162 may determine that a particular pixel of the first group satisfies the membership criterion in response to determining that the particular pixel is associated with the wavelength 471 and is within a threshold distance of at least one other pixel of the first group.

Similarly, the BSD estimator 162 may identify a second group of pixels of the image frame 444 as the beacon spot 474 in response to determining that each pixel of the second group of pixels satisfies the membership criterion. For example, the BSD estimator 162 may determine that a particular pixel of the second group satisfies the membership criterion corresponding to the wavelength 471 in response to determining that the particular pixel is associated with the wavelength 471 and is within a threshold distance of at least one other pixel of the second group. In some implementations, the BSD estimator 162 may identify more than two beacon spots corresponding to the wavelength 471.

The BSD estimator 162 may identify a third group of pixels of the image frame 444 as the beacon spot 482 in response to determining that each pixel of the third group satisfies a membership criterion associated with a wavelength 481. In a particular aspect, the wavelength 471 may correspond to the first wavelength 171, the second wavelength 181 of FIG. 1, or another wavelength. The BSD estimator 162 may identify a fourth group of pixels of the image frame 444 as the beacon spot 484 in response to determining that each pixel of the fourth group satisfies the membership criterion associated with the wavelength 481. It should be understood that although beacon spots 472, 474, 482, and 484 are illustrated in FIG. 4 as non-overlapping, in some implementations at least one of the beacon spots 472, 474, 482, and 484 may overlap another of the beacon spots 472, 474, 482, and 484. For example, at least some pixels associated with the beacon spot 472 may be interspersed with at least some pixels associated with the beacon spot 482 in the image frame 444. In other implementations, each of the beacon spots 472, 474, 482, and 484 may be non-overlapping.

The BSD estimator 162 may determine coordinates of beacon spots corresponding to the wavelength 471. For example, the BSD estimator 162 may determine first coordinates 462 of the beacon spot 472 and second coordinates 464 of the beacon spot 474. To illustrate, the first coordinates 462 may correspond to coordinates (e.g., first x-coordinate and first y-coordinate) of a first centroid of the beacon spot 472. The second coordinates 464 may correspond to coordinates (e.g., second x-coordinate and second y-coordinate) of a second centroid of the beacon spot 474. A centroid of a particular beacon spot may correspond to a mathematical centroid of the particular beacon spot or a binarized centroid of the particular beacon spot. A binarized centroid of a particular beacon spot may correspond to an arithmetic mean (e.g., average) position of pixels of the particular beacon spot.

The BSD estimator 162 may determine the BSD measurement 492 based on the beacon spots corresponding to the wavelength 471. The BSD measurement 492 may indicate a distance between the beacon spots corresponding to the wavelength 471. For example, the BSD measurement 492 may indicate a pixel distance between the beacon spot 472 and the beacon spot 474 in the image frame 444. The BSD estimator 162 may determine the BSD measurement 492 based on the first coordinates 462 and the second coordinates 464 based on the following Equation:

$$dist = \sqrt{xdiff^2 + ydiff^2}$$   Equation 6 where dist corresponds to the BSD measurement 492, xdiff corresponds to a difference between x-coordinates of the beacon spots 472-474 (e.g., xdiff=first x-coordinate−second x-coordinate), and y-diff corresponds to a difference between y-coordinates of the beacon spots 472-474 (e.g., ydiff=first y-coordinate−second y-coordinate). In an alternative implementation, the BSD estimator 162 may determine the BSD measurement 492 based on a distance (e.g., an average distance) between more than two beacon spots.

The BSD estimator 162 may store the BSD measurement 492 in the memory 116 of FIG. 1. For example, the analysis data 142 may include the BSD measurement 492. The BSD measurement 492 may be associated with the wavelength 471 and the timestamp 402. For example, the BSD estimator 162 may store the BSD measurement 492 with a reference to the wavelength 471, a reference to the timestamp 402, or both.

Figure 5:
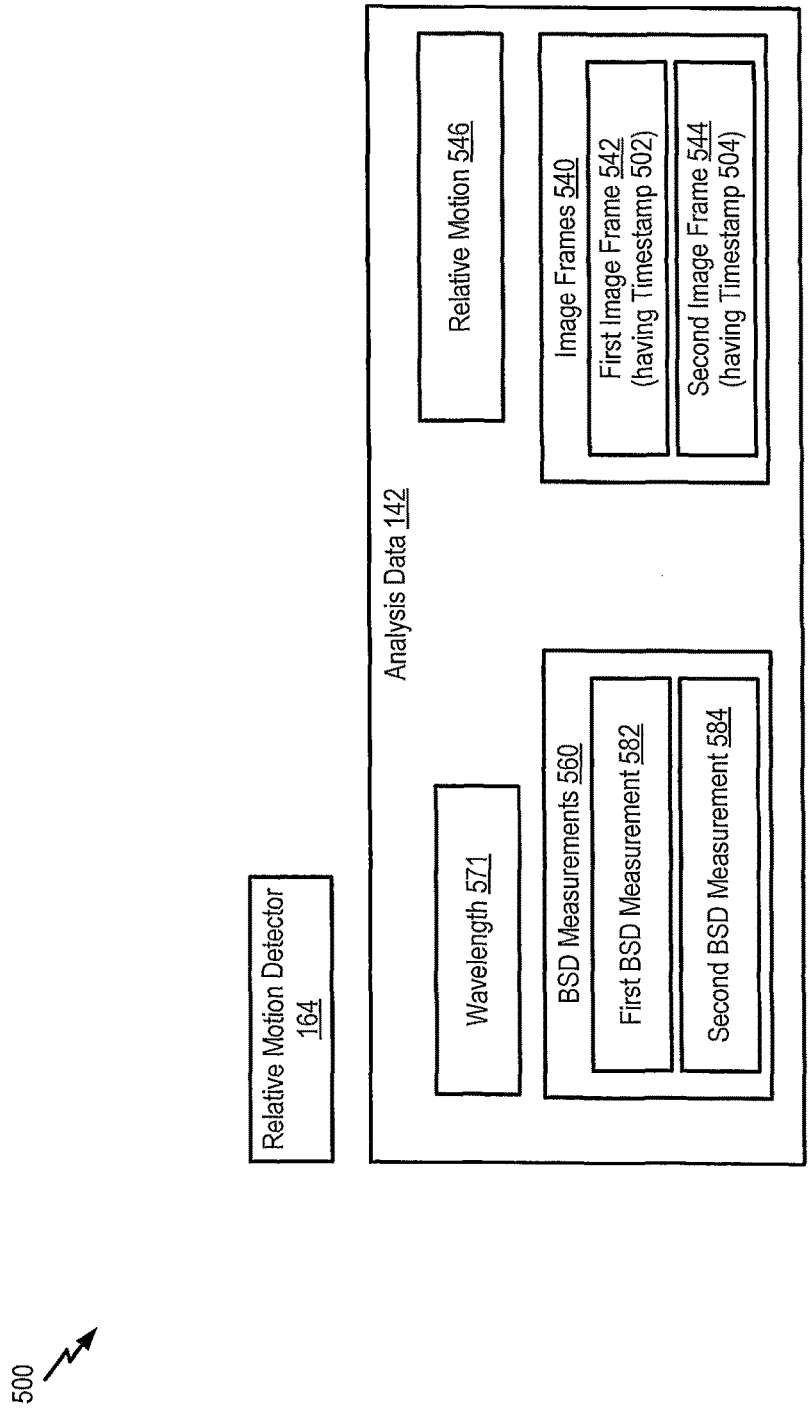
FIG. 5 is a diagram that illustrates an example of a relative motion detector of the system of FIG. 1.

FIG. 5 illustrates an example of the relative motion detector 164. The relative motion detector 164 is configured to determine a relative motion 546 corresponding to a wavelength 571 based on image frames 540, as described herein. The image frames 540 include at least a first image frame 542 and a second image frame 544. The image frames 140 of FIG. 1 may include one or more of the image frames 540. For example, one or more of the image frames 540 may be stored in the memory 116 of FIG. 1.

The first image frame 542 has a timestamp 502 and the second image frame 544 has a timestamp 504. For example, the image sensor 114 may generate the first image frame 542 at a first time and may generate the second image frame 544 at a second time. The first image frame 542 may capture a first image of an OP corresponding to the wavelength 571. The second image frame 544 may capture a second image of the OP. The timestamp 502 may indicate the first time. The timestamp 504 may indicate the second time. In a particular aspect, the OP corresponds to the first OP 170 and the wavelength 571 corresponds to the first wavelength 171. In an alternative aspect, the OP corresponds to the second OP 180 and the wavelength 571 corresponds to the second wavelength 181.

In a particular aspect, each of the first image frame 542 and the second image frame 544 captures images of multiple OPs. For example, the first image frame 542 captures a first image of the first OP 170 and a first image of the second OP 180. The second image frame 544 captures a second image of the first OP 170 and a second image of the second OP 180. During a first analysis of the image frames 540, the OP corresponds to the first OP 170 and the wavelength 571 corresponds to the first wavelength 171. During a second analysis of the image frames 540, the OP corresponds to the second OP 180 and the wavelength 571 corresponds to the second wavelength 181. The second analysis may be performed subsequent to or prior to the first analysis. In some aspects, the second analysis may be performed concurrently with the first analysis.

The BSD estimator 162 may determine, based on the image frames 540, BSD measurements 560 corresponding to the wavelength 571. For example, the BSD estimator 162 determines, based on the first image frame 542, a first BSD measurement 582 corresponding to the wavelength 571 and the timestamp 502, as described with reference to FIG. 4. To illustrate, the first image frame 542 may correspond to the image frame 444 of FIG. 4, the first BSD measurement 582 may correspond to the BSD measurement 492 of FIG. 4, the wavelength 571 may correspond to the wavelength 471 of FIG. 4, and the timestamp 502 may correspond to the timestamp 402 of FIG. 4.

The BSD estimator 162 determines, based on the second image frame 544, a second BSD measurement 584 corresponding to the wavelength 571 and the timestamp 504, as described with reference to FIG. 4. For example, the second image frame 544 may correspond to the image frame 444 of FIG. 4, the second BSD measurement 584 may correspond to the BSD measurement 492 of FIG. 4, the wavelength 571 may correspond to the wavelength 471 of FIG. 4, and the timestamp 504 may correspond to the timestamp 402 of FIG. 4.

The relative motion detector 164 may determine, based on the BSD measurements 560, the relative motion 546 of the OP corresponding to the wavelength 571. For example, the relative motion detector 164 may determine the relative motion 546 by calculating a variance based on the BSD measurements 560, as follows. The relative motion detector 164 may determine the relative motion 546 by calculating a sum of squared distances of each of the BSD measurements 560 from a mean value of the BSD measurements 560 and dividing the sum by a count of the BSD measurements 560.

In a particular aspect, the relative motion detector 164 may determine the relative motion 546 based on selected image frames (e.g., the image frames 540). For example, the relative motion detector 164 may select the image frames 540 from the image frames 140 in response to determining that the image frames 540 correspond to a particular number (e.g., 60) of the most recent image frames generated by the image sensor 114 of FIG. 1. The particular number may be based on a configuration setting. In a particular aspect, the particular number is based on a user input. For example, the device 102 may receive a user input indicating the particular number. The device 102 may update a configuration setting to indicate the particular number. The relative motion detector 164 may select the image frames 540 from the image frames 140 in response to determining that timestamps associated with the image frames 540 indicate that the image frames 540 correspond to the particular number of most recent image frames captured by the image sensor 114.

In a particular aspect, the relative motion detector 164 may select the image frames 540 from the image frames 140 in response to determining that the image frames 540 correspond to a particular time range. For example, the relative motion detector 164 may select the image frames 540 in response to determining that each of the image frames 540 has a timestamp indicative of a time within the particular time range. The particular time range may be based on a configuration setting. In a particular aspect, the particular time range is based on a user input. The relative motion detector 164 may determine, based on the image frames 540, the relative motion 546 of the OP during the particular time range.

The relative motion detector 164 may store the relative motion 546 in the memory 116. For example, the analysis data 142 may include the relative motion 546. The relative motion 546 may be associated with the wavelength 571 and the particular time range. For example, the relative motion detector 164 may store the relative motion 546 with a reference to the wavelength 571, a reference to the particular time range, or both.

The turbulence estimator 112 of FIG. 1 may determine a turbulence estimate corresponding to the wavelength 571 based on the relative motion 546, as described with reference to FIG. 1. In a particular aspect, the turbulence estimate may correspond to the first TE 156 of FIG. 1, the wavelength 571 may correspond to the first wavelength 171 of FIG. 1, and the relative motion 546 may correspond to the first relative motion 146. In an alternate aspect, the turbulence estimate may correspond to the second TE 158 of FIG. 1, the wavelength 571 may correspond to the second wavelength 181 of FIG. 1, and the relative motion 546 may correspond to the second relative motion 148.

Figure 6:
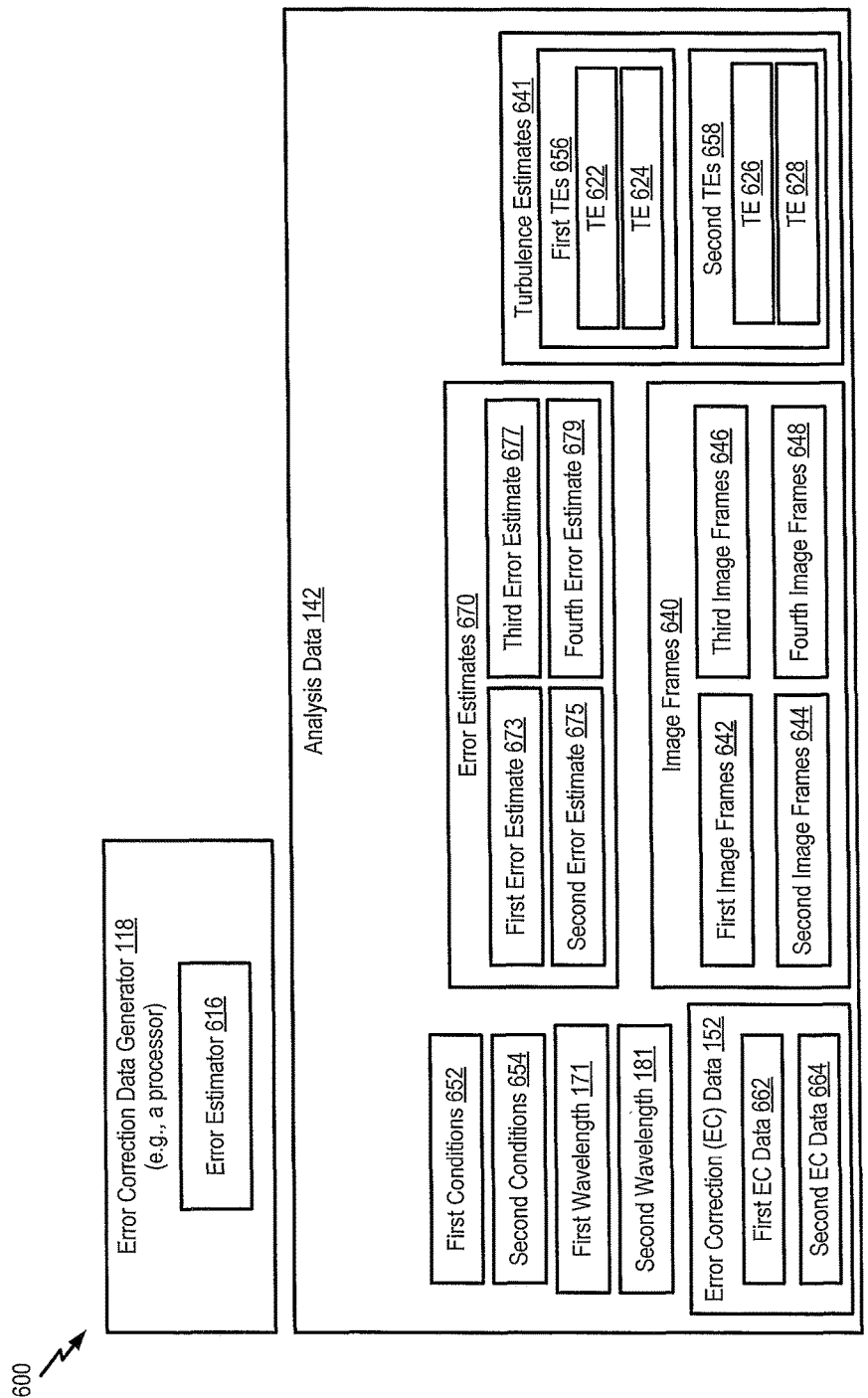
FIG. 6 is a diagram that illustrates an example of an error correction data generator of the system of FIG. 1.

FIG. 6 illustrates an example of the error correction data generator 118. The error correction data generator 118 includes an error estimator 616. The error estimator 616 is configured to generate the error correction data 152 based on images frames 640, as described herein. The image frames 140 of FIG. 1 may include one or more of the image frames 640. For example, one or more of the image frames 640 may be stored in the memory 116 of FIG. 1.

The image frames 640 include first image frames 642 and second image frames 644. The first image frames 642 may correspond to first conditions 652. For example, the image sensor 114 may generate the first image frames 642 during a first time interval under the first conditions 652. The first conditions 652 may correspond to a day, a time of day, a weather condition, an altitude, a location, a level of scintillation, a level of turbulence, or a combination thereof. The first conditions 652 may occur naturally or may be simulated using wave-optic simulations. Similarly, the second image frames 644 may correspond to second conditions 654. For example, the image sensor 114 may generate the second image frames 644 during a second time interval under the second conditions 654. The second conditions 654 may correspond to a day, a time of day, a weather condition, an altitude, a location, a level of scintillation, a level of turbulence, or a combination thereof. In a particular aspect, the first conditions 652 differ from the second conditions 654 in at least one respect. Each of the first image frames 642 may capture an image of at least the first OP 170 and an image of the second OP 180. For example, a first image frame of the first image frames 642 may capture, at a first time, a first image of the first OP 170 and a first image of the second OP 180, or both. A second image frame of the first image frames 642 may capture, at a second time, a second image of the first OP 170 and a second image of the second OP 180.

The error estimator 616 may determine turbulence estimates 641 based on the image frames 640. For example, the error estimator 616 may determine first turbulence estimates (TEs) 656 corresponding to the first wavelength 171. The error correction data generator 118 (e.g., the error estimator 616) may determine a TE corresponding to a wavelength and one or more conditions, as described with reference to FIG. 1. For example, the error estimator 616 may determine a TE 622 corresponding to the first wavelength 171 and the first conditions 652 based on the first image frames 642. As another example, the error estimator 616 may determine a TE 624 corresponding to the first wavelength 171 and the second conditions 654 based on the second image frames 644.

The error estimator 616 may determine second TEs 658 corresponding to the second wavelength 181. For example, the error estimator 616 may determine a TE 626 corresponding to the second wavelength 181 and the first conditions 652 based on the first image frames 642. The error estimator 616 may determine a TE 628 corresponding to the second wavelength 181 and the second conditions 654 based on the second image frames 644. In a particular aspect, the TE 622 may correspond to the first TE 156 of FIG. 1 and the TE 626 may correspond to the second TE 158 of FIG. 1. In an alternate aspect, the TE 624 may correspond to the first TE 156 of FIG. 1 and the TE 628 may correspond to the second TE 158 of FIG. 1.

The error estimator 616 may determine error estimates 670 corresponding to the turbulence estimates 641 based on the following Equation:

$$e(r0) = \left(\frac{r0_2}{r0_1}\right)\left(\frac{\lambda_2^2}{\lambda_1^2}\right)^{-3/5} \quad \text{Equation 7}$$

where a first wavelength ($\lambda_1$) is shorter than a second wavelength ($\lambda_2$), $e(r0)$ corresponds to an error estimate, $r0_1$ corresponds to a first turbulence estimate associated with the first wavelength ($\lambda_1$), and $r0_2$ corresponds to a second turbulence estimate associated with the second wavelength ($\lambda_2$). For example, the error estimator 616 may determine a first error estimate 673 ($e(r0)$) based on the TE 622 ($r0_1$), the TB 626 ($r0_2$), the first wavelength 171 ($\lambda_1$), and the second wavelength 181 ($\lambda_2$). For example, the error estimator 616 may determine a second error estimate 675 ($e(r0)$) based on the TE 624 ($r0_1$), the TE 628 ($r0_2$), the first wavelength 171 ($\lambda_1$), and the second wavelength 181 ($\lambda_2$).

The error estimator 616 may generate the error correction data 152 to indicate a relationship between the first TEs 656 corresponding to the first wavelength 171 and the second TEs 658 corresponding to the second wavelength 181. For example, the error estimator 616 may determine the error correction data 152 based on the first error estimate 673, the second error estimate 675, or both. To illustrate, the error correction data 152 may correspond to an average of the first error estimate 673 and the second error estimate 675.

In a particular aspect, the error estimator 616 may determine first error correction (EC) data 662 corresponding to the first conditions 652 based at least in part on the first error estimate 673. For example, the image frames 640 may include third image frames 646. The image sensor 114 of FIG. 1 may generate the third image frames 646 during a third time interval under the first conditions 652. The error estimator 616 may determine a third error estimate 677 based on the third image frames 646. The error estimator 616 may determine the first EC data 662 based on the first error estimate 673 and the third error estimate 677. For example, the first EC data 662 may correspond to an average of the first error estimate 673 and the third error estimate 677.

The error estimator 616 may generate second EC data 664 corresponding to the second conditions 654 based at least in part on the second error estimate 675. For example, the image frames 640 may include fourth image frames 648. The image sensor 114 may generate the fourth image frames 648 during a fourth time interval under the second conditions 654. The error estimator 616 may determine a fourth error estimate 679 based on the fourth image frames 648. The error estimator 616 may determine the second EC data 664 based on the second error estimate 675 and the fourth error estimate 679. For example, the second EC data 664 may correspond to an average of the second error estimate 675 and the fourth error estimate 679. The error correction data 152 may include the first EC data 662, the second EC data 664, or data (e.g., an average) based on the first EC data 662 and the second EC data 664.

In a particular aspect, the error correction data 152 may indicate that values of the first TEs 656 are in a first range for a corresponding value of the second TEs 658. For example, the first EC data 662 may indicate that, under the first conditions 652, values of the first TEs 656 are in a first particular range for a corresponding value of the second TEs 658. The second EC data 664 may indicate that, under the second conditions 654, the values of the first TEs 656 are in a second particular range for a corresponding value of the second TEs 658.

In a particular aspect, the error correction data 152 may indicate that values of the second TEs 658 are in a second range for a corresponding value of the first TEs 656. For example, the first EC data 662 may indicate that, under the first conditions 652, values of the second TEs 658 are in a first particular range for a corresponding value of the first TEs 656. The second EC data 664 may indicate that, under the second conditions 654, the values of the second TEs 658 are in a second particular range for a corresponding value of the first TEs 656. The error estimator 616 may determine that a first TE of the first TEs 656 corresponds to a second TE of the second TEs 658 in response to determining that each of the first TE and the second TE is generated based on the same image frames.

The error correction data generator 118 may store the error correction data 152 in the memory 116. For example, the analysis data 142 may include the error correction data 152. In a particular aspect, the error correction data generator 118 may provide the error correction data 152 to one or more other devices.

In a particular aspect, the device 102 may receive the error correction data 152 from another device. In a particular aspect, the error correction data 152 may be based on a third OP corresponding to the first wavelength 171 and a fourth OP corresponding to the second wavelength 181. The third OP may be generated by third optics of the device 102 or of another device. The fourth OP may be generated by fourth optics of the device 102 or of another device. The error correction data generator 118 may generate a first particular error estimate and a second particular error estimate based on the third OP and the fourth OP. In a particular aspect, the error correction data generator 118 may receive the first particular error estimate and the second particular error estimate from another device. The error correction data generator 118 may generate the error correction data 152 based on the first error estimate 673, the second error estimate 675, the third error estimate 677, the first particular error estimate, the second particular error estimate, or a combination thereof.

Figure 7:
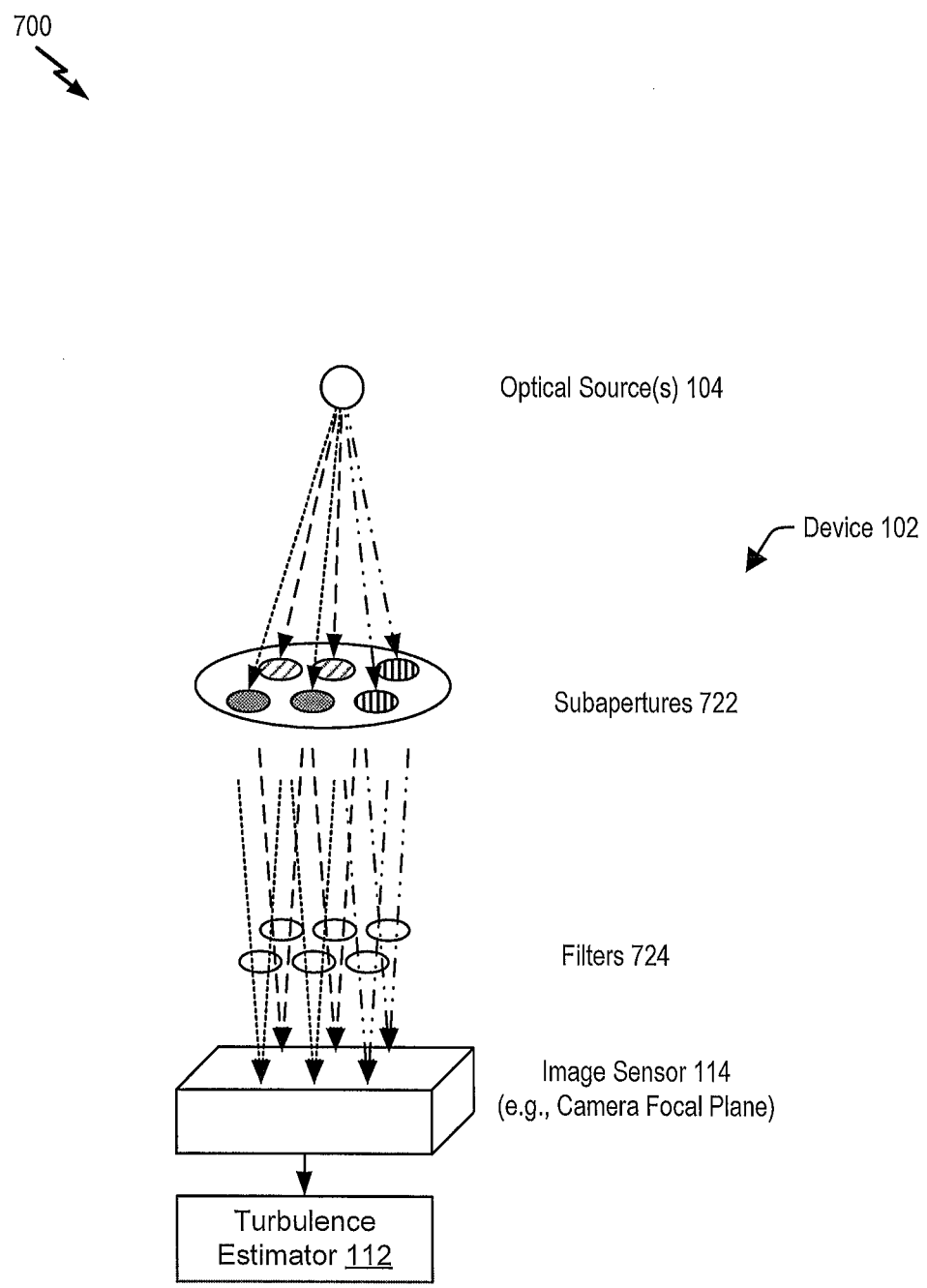
FIG. 7 is a diagram that illustrates an example of using more than 2 wavelengths to estimate turbulence.
Figure 8:
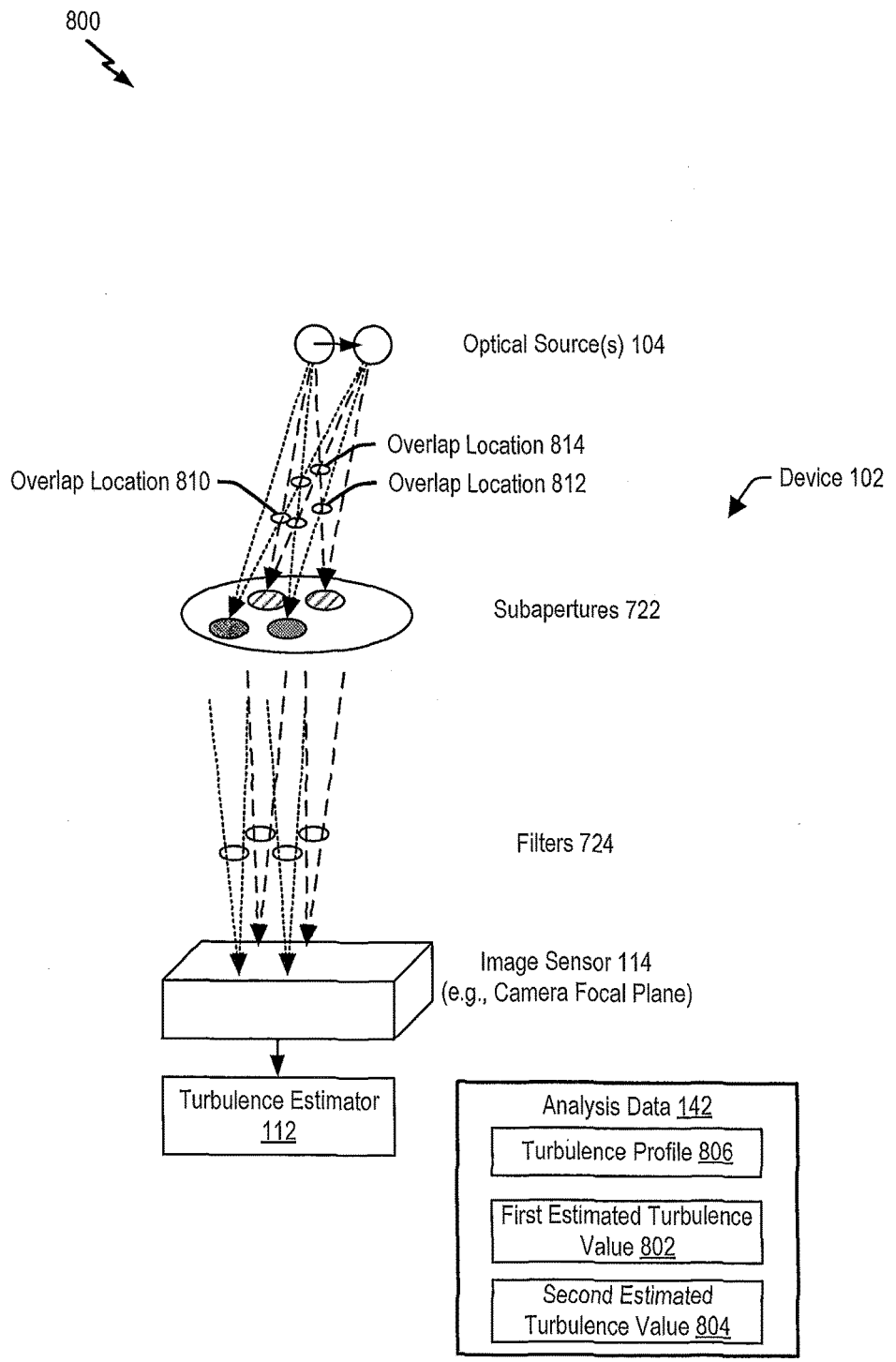
FIG. 8 is a diagram that illustrates an example of turbulence estimation in the presence of source motion.
Figure 9:
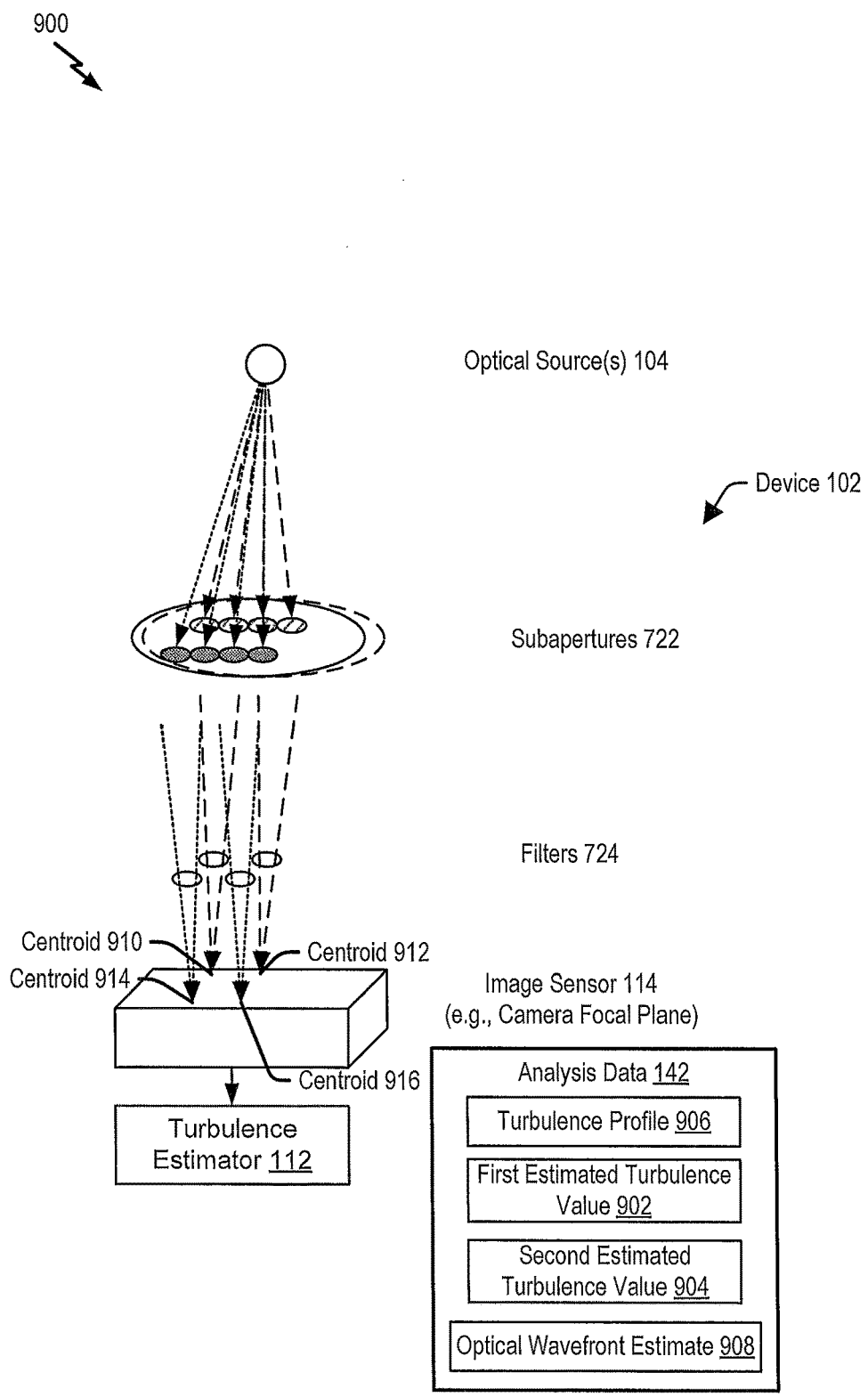
FIG. 9 is a diagram that illustrates an example of turbulence estimation in the presence of device/optics motion.
Figure 10:
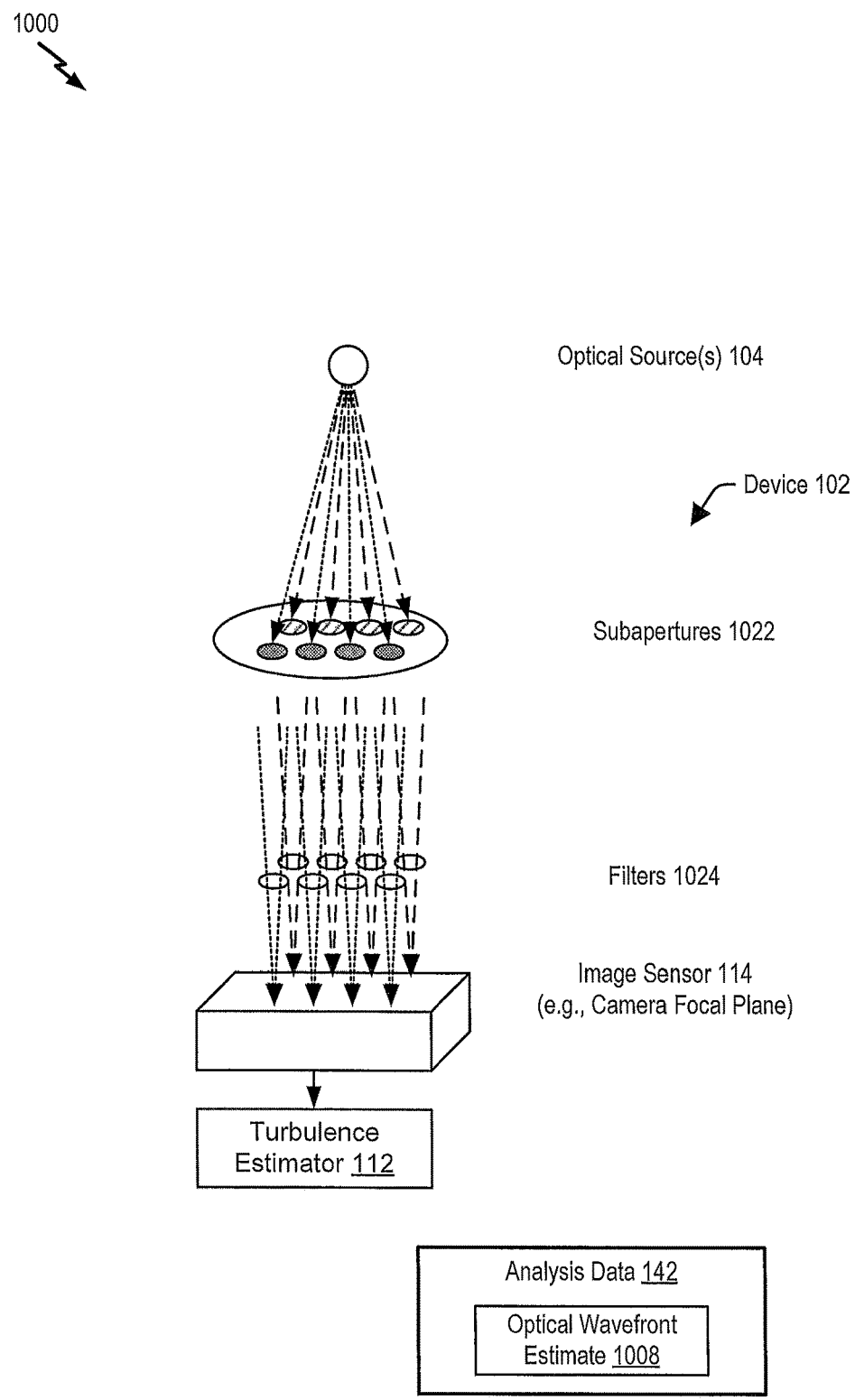
FIG. 10 is a diagram that illustrates an example of using more than 4 subapertures to estimate turbulence.
Figure 11:
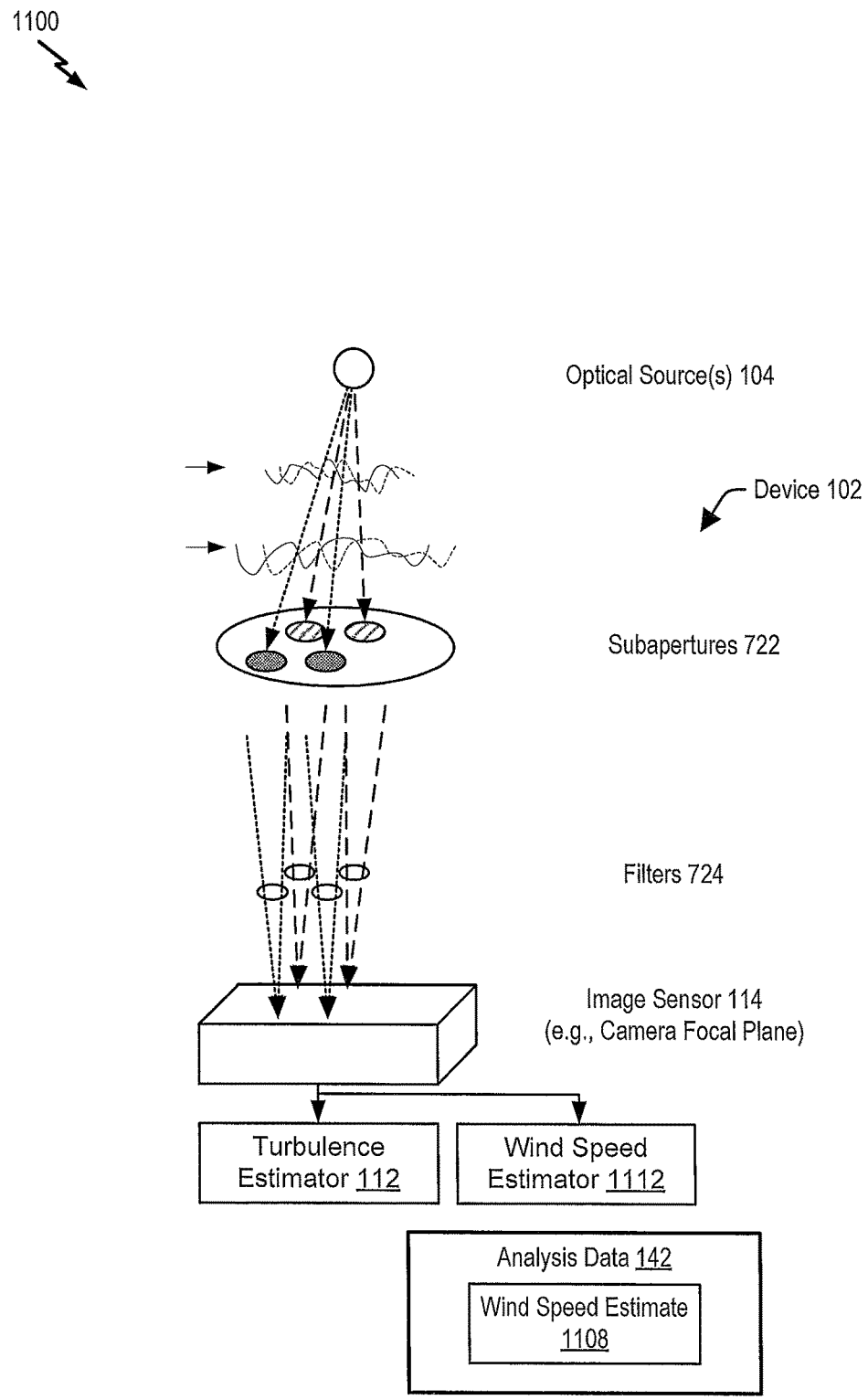
FIG. 11 is a diagram that illustrates an example of turbulence estimation based on correlation between images at different times.

FIGS. 7-11 illustrate various uses cases corresponding to the device 102 of FIG. 1. For example, FIG. 7 illustrates a use case where the turbulence estimator 112 determines the estimated turbulence value 150 based on more than two wavelengths. FIG. 8 illustrates a use case where the turbulence estimator 112 updates the estimated turbulence value 150. The turbulence estimator 112 also estimates a turbulence profile based on detecting optical source motion. FIG. 9 illustrates a use case where the turbulence estimator 112 updates the estimated turbulence value 150 and generates an estimate of an optical wavefront with relatively few subapertures based on motion of the device 102. FIG. 10 illustrates a use case where the turbulence estimator 112 determines the estimated turbulence value 150 and generates an estimate of an optical wavefront with relatively few subapertures. FIG. 11 illustrates a use case where the turbulence estimator 112 determines the estimated turbulence value 150 and a wind speed estimate based on correlation of images formed at various times by optical patterns.

FIG. 7 illustrates a use case 700. The use case 700 illustrates an example of the turbulence estimator 112 determining the estimated turbulence value 150 based on more than two wavelengths. In the use case 700, the device 102 includes subapertures 722. The subapertures 722 may correspond to the OE 212, the OE 214, the OE 316, the OE 318 of FIG. 3, and one or more additional OEs. In the use case 700, the device 102 includes at least 3 sets of optics. For example, the device 102 includes the first optics 122 of FIG. 1 including the OE 212 and the OE 214, the second optics 132 of FIG. 1 including the OE 316 and the OE 318, and third optics including additional OEs.

The device 102 includes filters 724 (e.g., spectral filters). The OE 212 and the OE 214 are configured to form the first OP 170 on the image sensor 114, as described with reference to FIGS. 1 and 3. For example, each of the OE 212 and the OE 214 includes one or more of the filters 724 that are configured to pass an optical signal having the first wavelength 171. The optical signals transmitted (e.g., passed) by the OE 212 and the OE 214 form the first OP 170.

The OE 316 and the OE 318 are configured to form the second OP 180 on the image sensor 114, as described with reference to FIGS. 1 and 3. For example, each of the OE 316 and the OE 318 includes one or more of the filters 724 that are configured to pass an optical signal having the second wavelength 181. The optical signals transmitted (e.g., passed) by the OE 316 and the OE 318 form the second OP 180.

The OEs of the third optics are configured to form a third OP on the image sensor 114. For example, each of the OEs of the third optics includes one or more of the filters 724 that are configured to pass an optical signal having a third wavelength. The optical signals transmitted (e.g., passed) by the third optics form the third OP. The turbulence estimator 112 determines the first TE 156 based on the first OP 170, the second TE 158 based on the second OP 180, and a third TE based on the third OP, as described with reference to FIG. 1. For example, the BSD estimator 162 of FIG. 1 may determine a plurality of BSD measurements corresponding to the third OP, as described with reference to FIGS. 4-5. The relative motion detector 164 of FIG. 1 may determine a relative motion of the third OP based on the plurality of BSD measurements, as described with reference to FIG. 5. The turbulence estimator 112 may determine the third TE based on the relative motion of the third OP, as described with reference to FIG. 1.

The turbulence estimator 112 determines the estimated turbulence value 150 based on the first TE 156, the second TE 158, the third TE, and the error correction data 152. For example, the turbulence estimator 112 may select the first TE 156 from the first TE 156, the second TE 158, and the third TE in response to determining that the first wavelength 171 is shorter than each of the second wavelength 181 and the third wavelength. The error correction data 152 may indicate a relationship between first TEs associated with the first wavelength 171, second TEs associated with the second wavelength 181, and third TEs associated with the third wavelength. For example, the error correction data 152 may indicate that the first TEs have a TE value or a range of TE values corresponding to the second TE 158 and the third TE. The turbulence estimator 112 may generate the estimated turbulence value 150 by adjusting the first TE 156 based on the TE value or the range of TE values, as described with reference to FIG. 1.

The use case 700 thus illustrates that the turbulence estimator 112 may determine the turbulence estimate 112 based on optical patterns corresponding to more than two wavelengths. Determining the estimated turbulence value 150 based on optical patterns corresponding to more wavelengths may increase the accuracy of the estimated turbulence value 150.

FIG. 8 illustrates a use case 800. The use case 800 illustrates an example of the turbulence estimator 112 updating the estimated turbulence value 150 and estimating a profile of turbulence strength along a path based on optical source motion. In the use case 800, the turbulence estimator 112 may determine, at a first time, the estimated turbulence value 150 (e.g., a first estimated turbulence value 802), as described with reference to FIG. 1. The turbulence estimator 112 may, in response to determining that the optical source(s) 104 have moved subsequent to the first time, update the estimated turbulence value 150, as described herein.

The turbulence estimator 112 may determine that the optical source(s) 104 have moved subsequent to the first time in response to determining that first data indicates that the optical source(s) 104 were at a first location at the first time, that second data indicates that the optical source(s) 104 were at a second location at a second time that is subsequent to the first time, and that the second location is distinct from the first location. For example, the first data may include first global positioning system (GPS) data, and the second data may include second GPS data. The turbulence estimator 112 may receive the first GPS data and the second GPS data from the optical source(s) 104 or from another device.

As another example, the first data may indicate that an optical signal received from the optical source(s) 104 had a first angle of arrival at the first time, and the second data may indicate that an optical signal received from the optical source(s) 104 had a second angle of arrival at the second time. The first angle of arrival and the second angle of arrival may be determined by a component (e.g., the turbulence estimator 112 or the image sensor 114) of the device 102.

In a particular aspect, the first data may indicate a first target location of the device 102, and the second data may indicate a second target location of the device 102. The first data (e.g., the first target location) and the second data (e.g., the second target location) may be based on a configuration setting or a user input.

The turbulence estimator 112 may, in response to determining that the optical source(s) 104 have moved subsequent to the first time, determine a second estimated turbulence value 804 based on image frames of FIG. 1, as described with reference to FIG. 1. Each of the image frames may be captured by the image sensor 114 subsequent to the first time. The first estimated turbulence value 802 may indicate an estimated turbulence along a first path between the first location of the optical source(s) 104 and the image sensor 114. The second estimated turbulence value 804 may indicate an estimated turbulence along a second path between the second location of the optical source(s) 104 and the image sensor 114. The turbulence estimator 112 may determine the first estimated turbulence value 802 based on a first subset of the image frames 140 of FIG. 1. The image sensor 114 may capture the first subset of the image frames 140 during a first time period ending prior to or at the first time. The first estimated turbulence value 802 may be indicative of turbulence during the first time period. The turbulence estimator 112 may determine the second estimated turbulence value 804 based on a second subset of the image frames 140 of FIG. 1. The image sensor 114 may capture the second subset of the image frames 140 during a second time period beginning at or subsequent to the first time. The second estimated turbulence value 804 may be indicative of turbulence during the second time period. The turbulence estimator 112 may update the estimated turbulence value 150 to indicate the second estimated turbulence value 804. Updating the estimated turbulence value 150 based on detecting movement of the optical source(s) 104 may increase an accuracy of the estimated turbulence value 150.

The turbulence estimator 112 may determine a turbulence profile 806 based on the first estimated turbulence value 802 and the second estimated turbulence value 804. The turbulence profile 806 may indicate turbulence strength in an area including the first path and the second path. Paths of first optical signals received from the optical source(s) 104 at the first location may overlap paths of second optical signals received from the optical source(s) 104 at the second location. For example, as illustrated in FIG. 8, the paths may overlap at least at an overlap location 810, at an overlap location 812, and at an overlap location 814. The turbulence estimator 112 may solve, based on the overlapping paths, for turbulence-induced tilts at the overlapping locations 810, 812, and 814. For example, the turbulence estimator 112 may generate a set of linear equations corresponding to the overlapping paths. The turbulence estimator 112 may use the set of linear equations to solve for the turbulence-induced tilts at the overlapping locations 810, 812, and 814. The turbulence estimator 112 may generate (or update) the turbulence profile 806 based on the turbulence-induced tilts. For example, the turbulence estimator 112 may update the turbulence profile 806 to indicate first turbulence strength at the overlapping location 810. The first turbulence strength may correspond to a first turbulence-induced tilt. The turbulence estimator 112 may update the turbulence profile 806 to indicate second turbulence strength at the overlapping location 812. The second turbulence strength may correspond to a second turbulence-induced tilt. The turbulence estimator 112 may repeat the process for multiple movements of the optical source(s) 104 to generate the turbulence profile 806 based on overlapping locations.

FIG. 9 illustrates a use case 900. The use case 900 illustrates an example of the turbulence estimator 112 updating the estimated turbulence value 150 and generates an estimate of an optical wavefront with relatively few apertures based on detecting motion of the device 102. In the use case 900, the turbulence estimator 112 may determine, at a first time, the estimated turbulence value 150 (e.g., a first estimated turbulence value 902), as described with reference to FIG. 1. The turbulence estimator 112 may, in response to determining that the device 102 has moved subsequent to the first time, update the estimated turbulence value 150, as described herein.

The turbulence estimator 112 may determine that the device 102 has moved subsequent to the first time in response to determining that first data indicates that the device 102 was at a first location at the first time, that second data indicates that the device 102 was at a second location at a second time subsequent to the first time, and that the second location is distinct from the first location. For example, the first data may include first global positioning system (GPS) data, and the second data may include second GPS data. The turbulence estimator 112 may receive the first GPS data and the second GPS data from the memory 116 of FIG. 1. A navigation system associated with or coupled to the device 102 may provide the first GPS data and the second GPS data to the memory 116.

As another example, the first data may indicate that an optical signal received from the optical source(s) 104 had a first angle of arrival at the first time, and the second data may indicate that an optical signal received from the optical source(s) 104 had a second angle of arrival at the second time. The first angle of arrival and the second angle of arrival may be determined by a component (e.g., the turbulence estimator 112 or the image sensor 114) of the device 102.

In a particular aspect, the first data and the second data may indicate that optical patterns have shifted in a particular direction in a focal plane of the image sensor 114 subsequent to the first time. For example, the first data may indicate first coordinates in the image frame 144 of beacon spots of optical patterns, and the second data may indicate second coordinates in a second image frame of the beacon spots of the optical patterns. The image frame 144 may be captured by the image sensor 114 at the first time, and the second image frame may be captured by the image sensor 114 at a second time that is subsequent to the first time. The turbulence estimator 112 may determine that the device 102 has moved subsequent to the first time in response to determining that the second coordinates have shifted relative to the first coordinates in the same direction.

The turbulence estimator 112 may, in response to determining that the device 102 has moved subsequent to the first time, determine a second estimated turbulence value 904 based on image frames of FIG. 1, as described with reference to FIG. 1. Each of the image frames may be captured by the image sensor 114 subsequent to the first time. The first estimated turbulence value 902 may indicate an estimated turbulence along a first path between the optical source(s) 104 and a first location of the image sensor 114. The second estimated turbulence value 904 may indicate an estimated turbulence along a second path between the optical source(s) 104 and a second location of the image sensor 114.

The turbulence estimator 112 may determine the first estimated turbulence value 902 based on a first subset of the image frames 140 of FIG. 1. The image sensor 114 may capture the first subset of the image frames 140 during a first time period ending prior to or at the first time. The first estimated turbulence value 902 may be indicative of turbulence during the first time period. The turbulence estimator 112 may determine the second estimated turbulence value 904 based on a second subset of the image frames 140 of FIG. 1. The image sensor 114 may capture the second subset of the image frames 140 during a second time period beginning at or subsequent to the first time. The second estimated turbulence value 904 may be indicative of turbulence during the second time period.

The turbulence estimator 112 may update the estimated turbulence value 150 to indicate the second estimated turbulence value 904. Updating the estimated turbulence value 150 based on detecting movement of the device 102 may increase an accuracy of the estimated turbulence value 150.

The turbulence estimator 112 may determine a turbulence profile 906 based on the first estimated turbulence value 902 and the second estimated turbulence value 904, as described with reference to FIG. 8. For example, the turbulence profile 906 may indicate turbulence strength in an area including the first path and the second path.

The turbulence estimator 112 may determine an optical wavefront estimate 908, as described. For example, the turbulence estimator 112 may detect the first OP 170 and the second OP 180 at multiple times. For example, the beacon spot 472 of FIG. 4 may be formed by the OS 172 of FIG. 1 and the beacon spot 474 of FIG. 4 may be formed by the OS 174 of FIG. 1. The beacon spot 482 may be formed by the OS 182 of FIG. 1 and the beacon spot 484 of FIG. 4 may be formed by the OS 184. The BSD estimator 162 may determine, based on a first image frame (e.g., the image frame 144) of the image frames 140 of FIG. 1, first coordinates of the beacon spot 472, first coordinates of the beacon spot 474, first coordinates of the beacon spot 482, and first coordinates of the beacon spot 484, as described with reference to FIG. 4. Coordinates of a particular beacon spot may correspond to a centroid of the particular beacon spot. For example, the first coordinates of the beacon spot 472 may correspond to a centroid 910, the first coordinates of the beacon spot 474 may correspond to a centroid 912, the first coordinates of the beacon spot 482 may correspond to a centroid 914, the first coordinates of the beacon spot 484 may correspond to a centroid 916, or a combination thereof.

The BSD estimator 162 may determine, based on a second image frame (e.g., the image frame 144) of the image frames 140 of FIG. 1, second coordinates of the beacon spot 472, second coordinates of the beacon spot 474, second coordinates of the beacon spot 482, and second coordinates of the beacon spot 484, as described with reference to FIG. 4. The image sensor 114 may generate the first image frame at a first time and the second image frame at a second time. First coordinates of a particular beacon spot may be associated with the first time. For example, the particular beacon spot (e.g., a centroid of the particular beacon spot) may have first coordinates in the first image frame at the first time. Second coordinates of the particular beacon spot may be associated with the second time. For example, the particular beacon spot (e.g., a centroid of the particular beacon spot) may have second coordinates in the second image frame at the second time. In a particular aspect, the BSD estimator 162 may determine coordinates of a beacon spot corresponding to more than two image frames. For example, the BSD estimator 162 may determine third coordinates of the beacon spot in a third image frame, fourth coordinates of the beacon spot in a fourth image frame, coordinates of the beacon spot in one or more additional image frames, or a combination thereof.

A time series may indicate coordinates of a beacon spot at various times. For example, the turbulence estimator 112 may generate a first time series indicating the first coordinates of the beacon spot 472 at the first time and the second coordinates of the beacon spot 472 at the second time. The turbulence estimator 112 may generate a second time series indicating the first coordinates of the beacon spot 474 at the first time and second coordinates of the beacon spot 474 at the second time. Similarly, the turbulence estimator 112 may generate a third time series corresponding to the beacon spot 482, a fourth time series corresponding to the beacon spot 484, or both. In a particular aspect, the turbulence estimator 112 may generate a time series corresponding to fewer than four beacon spots or more than four beacon spots. For example, the turbulence estimator 112 may generate the first time series, the second time series, the third time series, the fourth time series, one or more additional time series, or a combination thereof.

The turbulence estimator 112 may generate the optical wavefront estimate 908 based on the first time series, the second time series, the third time series, the fourth time series, one or more additional time series, or a combination thereof. For example, the turbulence estimator 112 may generate the optical wavefront estimate 908 by summing the first time series, the second time series, the third time series, the fourth time series, one or more additional time series, or a combination thereof. As another example, the turbulence estimator 112 may determine a series of tilts of the optical wavefront corresponding to the first time series, the second time series, the third time series, the fourth time series, one or more additional time series, or a combination thereof. The turbulence estimator 112 may determine the optical wavefront estimate 908 by summing the series of tilts. The optical wavefront estimate 908 may correspond to an estimate of portions of an optical wavefront along a path between the optical source(s) 104 and the image sensor 114.

FIG. 10 illustrates a use case 1000. The use case 1000 illustrates an example of the turbulence estimator 112 determining the estimated turbulence value 150 based on optical patterns formed by optics that include more than two subapertures for each wavelength. In the use case 1000, the device 102 includes subapertures 1022. The subapertures 1022 may correspond to the OE 212, the OE 214, the OE 316, the OE 318 of FIG. 3, and one or more additional OEs. In the use case 1000, each of the first optics 122 and the second optics 132 of FIG. 1 include more than two optical elements. For example, the first optics 122 include the OE 212, the OE 214, and one or more additional OEs, and the second optics 132 include the OE 316, the OE 318, and one or more additional OEs.

The device 102 includes filters 1024 (e.g., spectral filters). Each of the OE 212, the OE 214, and the additional OEs of the first optics 122 may include one or more of the filters 1024 that are configured to pass an optical signal having the first wavelength 171. Optical signals transmitted (e.g., passed) by the first optics 122 may form the first OP 170.

Each of the OE 316, the OE 318, and the additional OEs of the second optics 132 may include one or more of the filters 1024 that are configured to pass an optical signal having the second wavelength 181. Optical signals transmitted (e.g., passed) by the second optics 132 may form the second OP 180.

The BSD estimator 162 may determine a first plurality of BSD measurements corresponding to the first OP 170. For example, BSD estimator 162 may determine a first BSD measurement based on coordinates in the image frame 144 of beacon spots of the first OP 170. In a particular aspect, the BSD estimator 162 may determine a distance between each pair of beacon spots of the first OP 170. For example, the BSD estimator 162 may determine a first BSD measurement corresponding to a first distance between the beacon spot 472 of the first OP 170 and the beacon spot 474 of the first OP 170, as described with reference to FIG. 4. The BSD estimator 162 may determine a second BSD measurement corresponding to a second distance between the beacon spot 472 and another beacon spot of the first OP 170. Similarly, the BSD estimator 162 may determine a second plurality of BSD measurements corresponding to the second OP 180.

The turbulence estimator 121 may determine the first TE 156 based on the first plurality of BSD measurements, and the second TE 158 based on the second plurality of BSD measurements, as described with reference to FIGS. 1, 4, and 5. The turbulence estimator 112 may determine the estimated turbulence value 150 based on the first TE 156, the second TE 158, and the error correction data 152, as described with reference to FIG. 1. The turbulence estimator 112 may thus determine the estimated turbulence value 150 based on optical patterns formed by optics that include more than two subapertures for each wavelength.

The turbulence estimator 112 may determine an optical wavefront estimate 1008 based on optical patterns formed by more than two subapertures per wavelength. For example, the first optics 122 of FIG. 1 may include more than two subapertures. To illustrate, the first optics 122 may include the OE 212, the OE 214, and a third OE. The OE 212, the OE 214, and the third OE may include the subaperture 220, the subaperture 221, and a third subaperture, respectively. The first OP 170 may include the beacon spot 472, the beacon spot 474 of FIG. 4, and a third beacon spot. The beacon spot 472 may be formed by the OS 172 transmitted from (e.g., passed through) the subaperture 220. The beacon spot 474 may be formed by the OS 174 transmitted from (e.g., passed through) the subaperture 221. The OS 106 from the optical source(s) 104 may pass through the third subaperture and the third OE to form a third OS. The third OS may form the third beacon spot at the image sensor 114 of FIG. 1. The BSD estimator 162 may determine the first coordinates 462 of the beacon spot 472, the second coordinates 464 of the beacon spot 474, and third coordinates of the third beacon spot. Coordinates of a particular beacon spot may correspond to a centroid of the particular beacon spot, as described with reference to FIG. 4.

The turbulence estimator 112 may determine the optical wavefront estimate 1008 by spatially summing (or interpolating) tilts of the optical wavefront corresponding to centroids of beacon spots formed by the more than two subapertures per wavelength. For example, the turbulence estimator 112 may estimate portions of the optical wavefront based on the first coordinates 462, the second coordinates 464, the third coordinates corresponding to the first wavelength 171, coordinates of the beacon spot 482, coordinates of the beacon spot 484 of FIG. 4, coordinates of one or more additional beacon spots corresponding to the second wavelength 181, or a combination thereof.

FIG. 11 illustrates a use case 1100. The use case 1100 illustrates an example of the turbulence estimator 112 determining the estimated turbulence value 150 based on images formed at various times by optical patterns. In the use case 1100, the image sensor 114 may generate the image frames 140 capturing images of the first OP 170 and the second OP 180. The turbulence estimator 112 may determine the estimated turbulence value 150 based on the image frames 140, as described herein.

The image sensor 114 may generate, at a first time, the image frame 144 capturing a first image of the first OP 170 and a first image of the second OP 180. The image sensor 114 may generate, at a second time, a second image frame capturing a second image of the first OP 170 and a second image of the second OP 180. The turbulence estimator 112 may determine the estimated turbulence value 150 based on the image frame 144 and the second image frame, as described with reference to FIG. 1. The turbulence estimator 112 may thus determine the estimated turbulence value 150 based on images formed at various times' by optical patterns.

In the use case 1100, the device 102 also includes a wind speed estimator 1112 (e.g., a processor). The wind speed estimator 1112 is configured to determine a wind speed estimate 1108 (e.g., a wind profile) associated with a path between the optical source(s) 104 and the device 102 (e.g., the image sensor 114). For example, the wind speed estimator 1112 may determine the wind speed estimate 1108 based on correlations of a time series of coordinates corresponding to a pair of subapertures associated with the same wavelength. For example, the beacon spot 472 of FIG. 4 may be formed by the OS 172 passing through the subaperture 220 of FIG. 2. The beacon spot 474 of FIG. 4 may be formed the OS 174 passing through the subaperture 221 of FIG. 2. The BSD estimator 162 may determine, based on a first image frame (e.g., the image frame 144) of the image frames 140 of FIG. 1, first coordinates of the beacon spot 472 (e.g., the first coordinates 462) and first coordinates of the beacon spot 474 (e.g., the second coordinates 464), as described with reference to FIG. 4. The BSD estimator 162 may determine, based on a second image frame (e.g., the image frame 144) of the image frames 140 of FIG. 1, second coordinates of the beacon spot 472 (e.g., the first coordinates 462) and second coordinates of the beacon spot 474 (e.g., the second coordinates 464), as described with reference to FIG. 4. The image sensor 114 may generate the first image frame at a first time and the second image frame at a second time.

The wind speed estimator 1112 may determine correlations based on multiple measurements (e.g., beacon spot coordinates) corresponding to the subaperture 220 and the subaperture 221. A first time-series associated with the subaperture 220 may indicate that the first coordinates of the beacon spot 472 are associated with the first time and that the second coordinates of the beacon spot 472 are associated with the second time. A second time-series associated with the subaperture 221 may indicate that the first coordinates of the beacon spot 474 are associated with the first time and that the second coordinates of the beacon spot 474 are associated with the second time. The wind speed estimator 1112 may determine a temporal correlation between the first time-series and the second time-series. The wind speed estimator 1112 may determine, based on a peak of the temporal correlation, an amount of time offset for turbulent eddies (e.g., wind) to move from one region to another region of an area between the optical source(s) 104 and the image sensor 114.

The wind speed estimator 1112 may determine the wind speed estimate 1108 by dividing spacing (e.g., a distance) between the subaperture 220 and the subaperture 221 by the amount of time offset corresponding to the peak of temporal correlation. The wind speed estimate 1108 may indicate a component of velocity along an axis between the subaperture 220 and the subaperture 221. The wind speed estimator 1112 may determine estimated wind speeds at multiple locations along a path between the optical source(s) 104 and the image sensor 114. For example, the wind speed estimator 1112 may determine the estimated wind speeds based on temporal correlations corresponding to multiple optical sources (e.g., as described with reference to FIG. 1), moving sources (e.g., as described with reference to FIG. 8), or a combination thereof. In a particular aspect, the first OP 170 includes the beacon spot 472 and the beacon spot 474. In this particular aspect, the wind speed estimate 1108 corresponds to the first wavelength 171.

In a particular aspect, the wind speed estimator 1112 may determine, based on the first OP 170, a first wind speed estimate corresponding to the first wavelength 171. The wind speed estimator 1112 may determine, based on the second OP 180, a second wind speed estimate corresponding to the second wavelength 181. The wind speed estimator 1112 may determine the wind speed estimate 1108 based on the first wind speed estimate, the second wind speed estimate, or both. For example, the wind speed estimate 1108 may indicate the first wind speed or the second wind speed. As another example, the wind speed estimate 1108 may indicate an average wind speed based on the first wind speed and the second wind speed. The wind speed estimator 1112 may thus determine a wind speed estimate based on optical patterns corresponding to various wavelengths.

Figure 12:
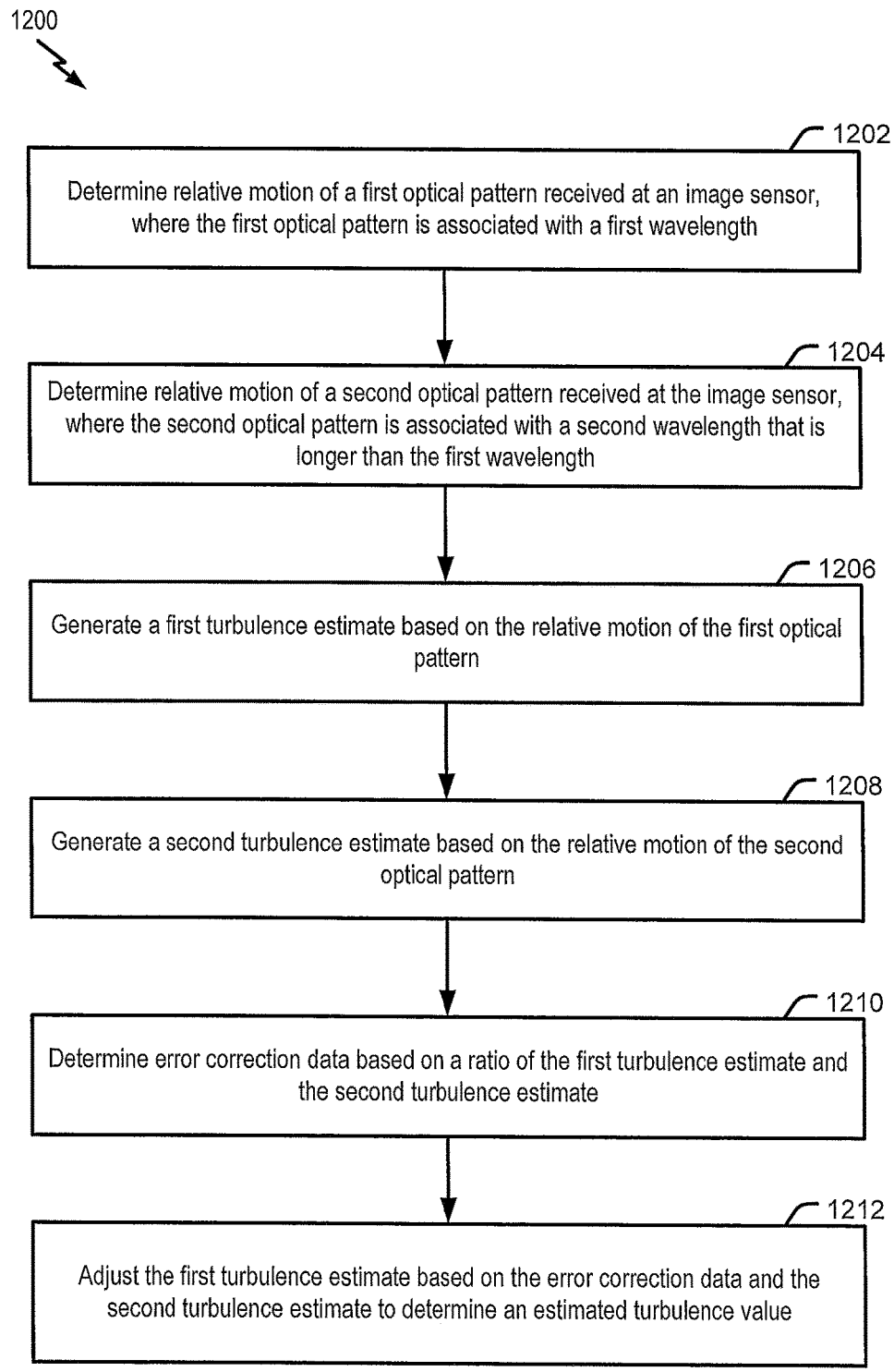
FIG. 12 is a flow chart of an example of a method of estimating turbulence.

FIG. 12 illustrates a particular example of a method 1200. The method 1200 may correspond to a method of estimating turbulence. The method 1200 may be performed by the system 100, the device 102, the turbulence estimator 112, the BSD estimator 162, the relative motion detector 164, the error correction data generator 118 of FIG. 1, the aircraft 1300, the systems 1320, the navigation or weapons system 1332 of FIG. 13, or a combination thereof.

The method 1200 includes determining relative motion of a first optical pattern received at an image sensor, at 1202. For example, the relative motion detector 164 of FIG. 1 may determine the first relative motion 146 of the first OP 170 received at the image sensor 114, as described with reference to FIGS. 1 and 5. The first OP 170 may be associated with the first wavelength 171.

The method 1200 also includes determining relative motion of a second optical pattern received at the image sensor, at 1204. For example, the relative motion detector 164 of FIG. 1 may determine the second relative motion 148 of the second OP 180 received at the image sensor 114, as described with reference to FIGS. 1 and 5. The second OP 180 may be associated with the second wavelength 181. The second wavelength 181 may be longer than the first wavelength 171.

The method 1200 further includes generating a first turbulence estimate based on the relative motion of the first optical pattern, at 1206. For example, the turbulence estimator 112 may generate the first TE 156 based on the first relative motion 146 of the first OP 170, as described with reference to FIG. 1.

The method 1200 also includes generating a second turbulence estimate based on the relative motion of the second optical pattern, at 1208. For example, the turbulence estimator 112 may generate the second TE 158 based on the second relative motion 148 of the second OP 180, as described with reference to FIG. 1.

The method 1200 further includes determining error correction data based on a ratio of the first turbulence estimate and the second turbulence estimate, at 1210. For example, the error estimator 616 may determine (e.g., generate or update) the error correction data 152 based on a ratio of the first TE 156 and the second TE 158, as described with reference to FIGS. 1 and 6.

The method 1200 also includes adjusting the first turbulence estimate based on error correction data and the second turbulence estimate to determine an estimated turbulence value, at 1212. For example, the turbulence estimator 112 may adjust the first TE 156 based on the error correction data 152 and the second TB 158 to determine the estimated turbulence value 150, as described with reference to FIG. 1. The estimated turbulence value 150 may be associated with a path between the image sensor 114 and the optical source(s) 104.

The method 1200 may thus enable the turbulence estimator 112 to determine a more accurate estimated turbulence value. For example, the error correction data 152 may indicate a relationship between first turbulence estimates corresponding to the first wavelength 171 and second turbulence estimates corresponding to the second wavelength 181. Adjusting the first TE 156 based on the error correction data 152 and the second TE 158 may reduce (e.g., eliminate) an error in the first TE 156. The estimated turbulence value 150 (corresponding to the adjusted first TE 156) may be a more accurate estimate of turbulence as compared to the first TE 156 (prior to adjustment) and the second TE 158.

Figure 13:
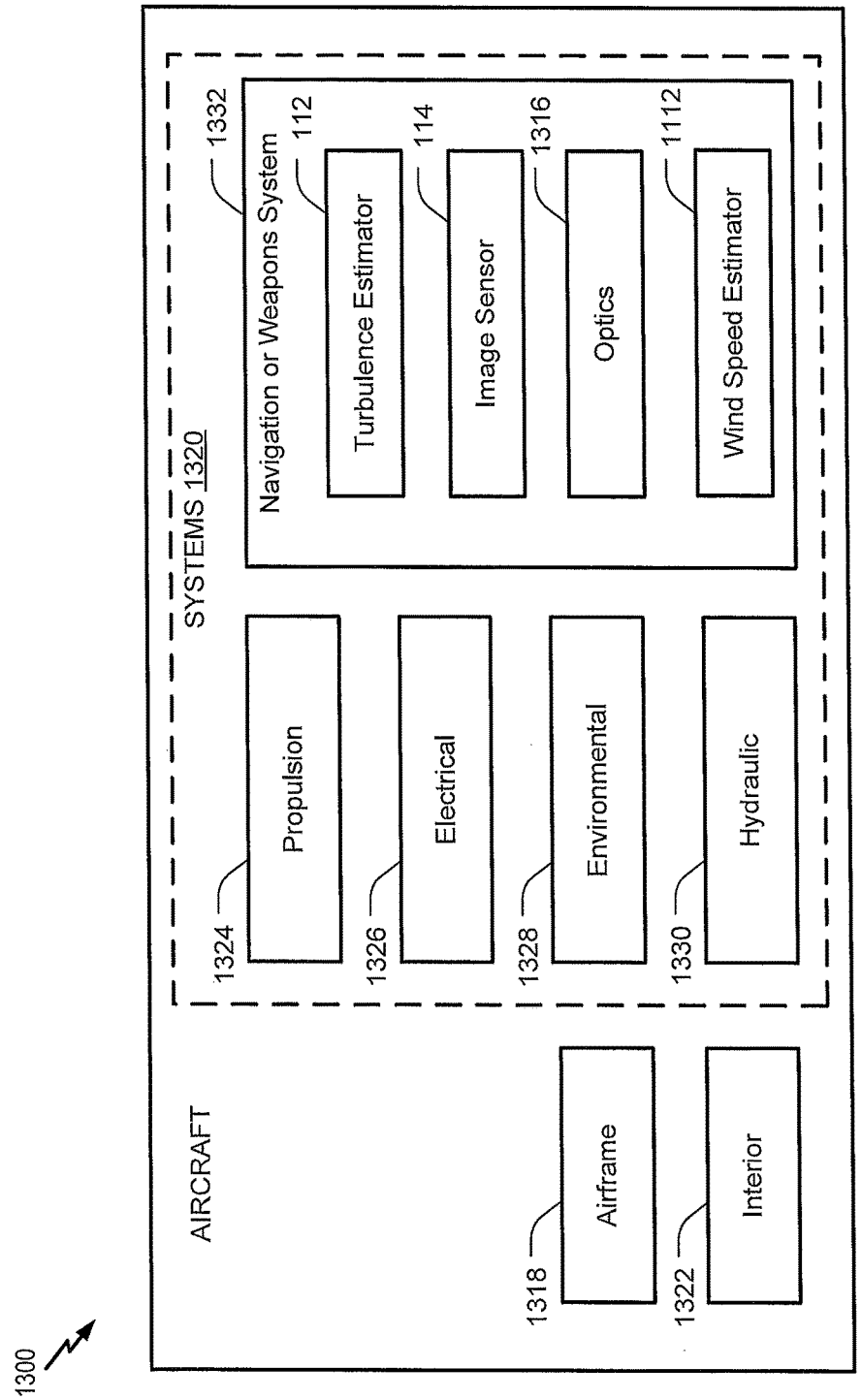
FIG. 13 is a block diagram of an illustrative implementation of an aircraft including a turbulence estimator.

Referring to FIG. 13, a block diagram of an illustrative implementation of an aircraft is shown and designated 1300. The aircraft 1300 may be manned or unmanned (e.g., a drone or an unmanned aerial vehicle (UAV)).

As shown in FIG. 13, the aircraft 1300 may include an airframe 1318, an interior 1322, and a plurality of systems 1320. The plurality of systems 1320 may include one or more of a propulsion system 1324, an electrical system 1326, an environmental system 1328, or a hydraulic system 1330. The plurality of systems 1320 includes a navigation or weapons system 1332. The navigation or weapons system 1332 may include the turbulence estimator 112, the image sensor 114, optics 1316, the wind speed estimator 1112, or a combination thereof. The optics 1316 may include at least one of the first optics 122, the second optics 132 of FIG. 1, the first spectral filter 222, the second spectral filter 224, the first wedge prism 226, the second wedge prism 228 of FIG. 2, the aperture fixture 302, the OE 212, the OE 214, the OE 316, the OE 318, the OE 350, or the OE 370 of FIG. 3. The turbulence estimator 112 may be configured to execute computer-executable instructions (e.g., a program of one or more instructions) stored in a memory. The instructions, when executed, cause the turbulence estimator 112, to perform one or more operations of the method 1200 of FIG. 12.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A device comprising:
   an image sensor;
   first optics configured to form a first optical pattern on the image sensor, wherein the first optical pattern is associated with a first wavelength;
   second optics configured to form a second optical pattern on the image sensor, wherein the second optical pattern is associated with a second wavelength that is longer than the first wavelength; and
   a processor coupled to the image sensor, the processor configured to:
   generate a first turbulence estimate based on relative motion of the first optical pattern;
   generate a second turbulence estimate based on relative motion of the second optical pattern;
   determine error correction data based on a ratio of the first turbulence estimate and the second turbulence estimate; and
   adjust the first turbulence estimate based on the error correction data and the second turbulence estimate to determine an estimated turbulence value.

2. The device of claim 1, wherein the first optics are configured to generate the first optical pattern based on an optical signal received from an optical source, and wherein the second optics are configured to generate the second optical pattern based on the optical signal.

3. The device of claim 1, wherein the first optics are configured to generate the first optical pattern based on a first optical signal received from a first optical source, and wherein the second optics are configured to generate the second optical pattern based on a second optical signal received from a second optical source.

4. The device of claim 1, wherein the first optics include first subapertures and first spectral filters, wherein each of the first spectral filters is configured to pass an optical signal having the first wavelength, wherein the first optics include one or more wedge prisms aligned with at least one of the first subapertures, wherein the second optics include second subapertures and second spectral filters, and wherein each of the second spectral filters is configured to pass a second optical signal having the second wavelength.

5. The device of claim 4, wherein the first subapertures include more than two subapertures, wherein optical signals passed through the first subapertures form the first optical pattern, and wherein the processor is further configured to:
   determine a first set of coordinates of portions of the first optical pattern;
   determine a second set of coordinates of portions of the second optical pattern; and
   estimate at least a portion of an optical wavefront based on the first set of coordinates and the second set of coordinates.

6. The device of claim 1, wherein the estimated turbulence value is associated with a first time period, wherein the first optical pattern is based on an optical signal received from an optical source, and wherein the processor is configured, in response to determining that the image sensor, the optical source, or both, have moved subsequent to the first time period, to determine a second estimated turbulence value based on relative motion of the first optical pattern during a second time period and relative motion of the second optical pattern during the second time period.

7. The device of claim 1, wherein the first optical pattern is based on an optical signal received from an optical source, wherein the image sensor, the first optics, the second optics, and the processor are integrated into an aircraft, and wherein the optical source is located at or proximate to a landing location associated with the aircraft.

8. The device of claim 1, further comprising third optics configured to form a third optical pattern on the image sensor, wherein the processor is configured to determine at least the estimated turbulence value further based on relative motion of the third optical pattern.

9. A method comprising:
- determining, at a device, relative motion of a first optical pattern received at a first image sensor, wherein the first optical pattern is associated with a first wavelength;
- determining, at the device, relative motion of a second optical pattern received at the first image sensor, wherein the second optical pattern is associated with a second wavelength that is longer than the first wavelength;
- generating, at the device, a first turbulence estimate based on the relative motion of the first optical pattern;
- generating, at the device a second turbulence estimate based on the relative motion of the second optical pattern;
- determining, at the device, error correction data based on a ratio of the first turbulence estimate and the second turbulence estimate; and
- adjusting, at the device, the first turbulence estimate based on the error correction data and the second turbulence estimate to determine a first estimated turbulence value.

10. The method of claim 9, further comprising:
- capturing a first image of the first optical pattern at a first time;
- determining first coordinates associated with a first portion of the first optical pattern in the first image;
- determining second coordinates associated with a second portion of the first optical pattern in the first image; and
- determining a first distance measurement based on a difference between the first coordinates and the second coordinates,
- wherein the relative motion of the first optical pattern is determined based at least in part on the first distance measurement.

11. The method of claim 10, further comprising:
- capturing a second image of the first optical pattern at a second time;
- determining third coordinates associated with the first portion of the first optical pattern in the second image;
- determining fourth coordinates associated with the second portion of the first optical pattern in the second image; and
- determining a second distance measurement based on a difference between the third coordinates and the fourth coordinates,
- wherein the relative motion of the first optical pattern is determined based at least in part on a variance between the first distance measurement and the second distance measurement.

12. The method of claim 9, further comprising generating a first error estimate based on the first turbulence estimate, the second turbulence estimate, the first wavelength, and the second wavelength, wherein the error correction data is based at least in part on the first error estimate.

13. The method of claim 12, further comprising generating a second error estimate based on the first optical pattern, the second optical pattern, a third optical pattern, a fourth optical pattern, one or more additional optical patterns, or a combination thereof, wherein the error correction data is based on the first error estimate and the second error estimate.

14. The method of claim 9, further comprising:
- capturing a first image of the first optical pattern at a first time;
- determining first coordinates associated with a first portion of the first optical pattern in the first image;
- determining second coordinates associated with a second portion of the first optical pattern in the first image;
- capturing a second image of the first optical pattern at a second time;
- determining third coordinates associated with the first portion of the first optical pattern in the second image;
- determining fourth coordinates associated with the second portion of the first optical pattern in the second image; and
- determining an optical wavefront estimate based at least in part on the first coordinates, the second coordinates, the third coordinates, the fourth coordinates, or a combination thereof.

15. The method of claim 9, wherein the first optical pattern is based on an optical signal received from an optical source, wherein the first estimated turbulence value is associated with a first time period, the method further comprising, in response to determining that the first image sensor, the optical source, or both, have moved subsequent to the first time period:
- determining a second estimated turbulence value based on relative motion of the first optical pattern during a second time period and relative motion of the second optical pattern during the second time period; and
- determining a turbulence profile based on the first estimated turbulence value and the second estimated turbulence value.

16. The method of claim 9, further comprising:
- determining, at the device, relative motion of a third optical pattern received at a second image sensor, wherein the third optical pattern is associated with the first wavelength;
- determining, at the device, relative motion of a fourth optical pattern received at the second image sensor, wherein the fourth optical pattern is associated with the second wavelength;
- generating, at the device, a third turbulence estimate based on the relative motion of the third optical pattern;
- generating, at the device, a fourth turbulence estimate based on the relative motion of the fourth optical pattern;
- adjusting, at the device, the third turbulence estimate based on the error correction data and the fourth turbulence estimate to determine a second estimated turbulence value; and
- determining, at the device, a turbulence profile based on the first estimated turbulence value and the second estimated turbulence value.

17. A computer-readable storage device storing instructions that, when executed by a processor, cause the processor to perform operations comprising:
- determining relative motion of a first optical pattern received at an image sensor, wherein the first optical pattern is associated with a first wavelength;
- determining relative motion of a second optical pattern received at the image sensor, wherein the second optical pattern is associated with a second wavelength that is longer than the first wavelength;
- generating a first turbulence estimate based on the relative motion of the first optical pattern;
- generating a second turbulence estimate based on the relative motion of the second optical pattern;
- determining error correction data based on a ratio of the first turbulence estimate and the second turbulence estimate; and
- adjusting the first turbulence estimate based on the error correction data and the second turbulence estimate to determine an estimated turbulence value.

18. The computer-readable storage device of claim 17, wherein the operations further comprise:
  capturing a first image of the first optical pattern at a first time;
  determining first coordinates of a portion of the first optical pattern in the first image;
  capturing a second image of the first optical pattern at a second time;
  determining second coordinates of the portion of the first optical pattern in the second image; and
  determining an estimated wind speed based at least in part on the first coordinates and the second coordinates.

19. The computer-readable storage device of claim 18, wherein the operations further comprise:
  determining a first time series corresponding to the first optical pattern, the first time series indicating the first coordinates and the second coordinates; and
  determining a second time series corresponding to the second optical pattern,
  wherein the estimated wind speed is based on a correlation between the first time series and the second time series.

20. The computer-readable storage device of claim 17, wherein the operations further comprise, in response to determining that the estimated turbulence value satisfies a threshold, updating a power setting of a laser weapon, updating an irradiance duration setting of the laser weapon, or both.

* * * * *